United States Patent
Reed

(10) Patent No.: US 9,466,443 B2
(45) Date of Patent: *Oct. 11, 2016

(54) PHOTOCONTROL FOR LUMINAIRE CONSUMES VERY LOW POWER

(71) Applicant: Express Imaging Systems, LLC, Seattle, WA (US)

(72) Inventor: William G. Reed, Seattle, WA (US)

(73) Assignee: Express Imaging Systems, LLC, Renton, WA (US)

( * ) Notice: Subject to any disclaimer, the term of this patent is extended or adjusted under 35 U.S.C. 154(b) by 454 days.

This patent is subject to a terminal disclaimer.

(21) Appl. No.: 14/158,630

(22) Filed: Jan. 17, 2014

(65) Prior Publication Data

US 2015/0028693 A1     Jan. 29, 2015

Related U.S. Application Data

(60) Provisional application No. 61/849,841, filed on Jul. 24, 2013.

(51) Int. Cl.
| | |
|---|---|
| *H01H 9/54* | (2006.01) |
| *H05B 37/02* | (2006.01) |
| *H05B 33/08* | (2006.01) |
| *H02J 1/00* | (2006.01) |

(52) U.S. Cl.
CPC ............ *H01H 9/54* (2013.01); *H05B 33/0812* (2013.01); *H05B 33/0854* (2013.01); *H05B 37/0218* (2013.01); *Y02B 20/343* (2013.01); *Y02B 20/46* (2013.01); *Y10T 307/773* (2015.04)

(58) Field of Classification Search
CPC ........................................... H02J 1/00
USPC ......................................................... 307/125
See application file for complete search history.

(56) References Cited

U.S. PATENT DOCUMENTS

| | | | |
|---|---|---|---|
| 2,240,050 | A | 4/1941 | Nuebling |
| 2,745,055 | A | 5/1956 | Woerdemann |

(Continued)

FOREIGN PATENT DOCUMENTS

| | | |
|---|---|---|
| DE | 4001980 A1 | 8/1990 |
| EP | 1 734 795 A1 | 12/2006 |

(Continued)

OTHER PUBLICATIONS

Japanese Office Action, dated Jan. 6, 2015, for corresponding Japanese Application No. 2011-536564, 6 pages.

(Continued)

*Primary Examiner* — Robert Deberadinis
(74) *Attorney, Agent, or Firm* — Seed IP Law Group PLLC

(57) ABSTRACT

A photocontrol includes a switch that consumes very low power when the switch is turned ON and when it is turned OFF. The photocontrol can provide low-power digital control signals to high-impedance inputs of control devices that control the delivery of power to load devices, such as LED drivers that control the delivery of power to arrays of LEDs. The photocontrol also can provide power signals to control devices that control the delivery of power to light sources, such as electronic transformers that control the delivery of power to fluorescent lamps. The photocontrol may include a comparator that causes the photocontrol to have switching hysteresis.

42 Claims, 18 Drawing Sheets

(56) References Cited

U.S. PATENT DOCUMENTS

| | | |
|---|---|---|
| 3,374,396 A | 3/1968 | Bell et al. |
| 4,153,927 A | 5/1979 | Owens |
| 4,237,377 A | 12/1980 | Sansum |
| 4,663,521 A | 5/1987 | Maile |
| 5,086,379 A | 2/1992 | Denison et al. |
| 5,160,202 A | 11/1992 | Légaré |
| 5,161,107 A | 11/1992 | Mayeaux et al. |
| 5,230,556 A | 7/1993 | Canty et al. |
| 5,276,385 A | 1/1994 | Itoh et al. |
| 5,343,121 A | 8/1994 | Terman et al. |
| 5,349,505 A | 9/1994 | Poppenheimer |
| 5,450,302 A | 9/1995 | Maase et al. |
| 5,561,351 A | 10/1996 | Vrionis et al. |
| 5,589,741 A | 12/1996 | Terman et al. |
| 5,808,294 A | 9/1998 | Neumann |
| 5,869,960 A | 2/1999 | Brand |
| 5,892,331 A | 4/1999 | Hollaway |
| 5,892,335 A | 4/1999 | Archer |
| 5,936,362 A | 8/1999 | Alt et al. |
| 6,111,739 A | 8/2000 | Wu et al. |
| 6,149,283 A | 11/2000 | Conway et al. |
| 6,154,015 A | 11/2000 | Ichiba |
| 6,160,353 A | 12/2000 | Mancuso |
| 6,377,191 B1 | 4/2002 | Takubo |
| 6,612,720 B1 | 9/2003 | Beadle |
| 6,674,060 B2 | 1/2004 | Antila |
| 6,681,195 B1 | 1/2004 | Poland et al. |
| 6,746,274 B1 | 6/2004 | Verfuerth |
| 6,753,842 B1 | 6/2004 | Williams et al. |
| 6,828,911 B2 | 12/2004 | Jones et al. |
| 6,841,947 B2 | 1/2005 | Berg-johansen |
| 6,902,292 B2 | 6/2005 | Lai |
| 6,985,827 B2 | 1/2006 | Williams et al. |
| 7,019,276 B2 | 3/2006 | Cloutier et al. |
| 7,066,622 B2 | 6/2006 | Alessio |
| 7,081,722 B1 | 7/2006 | Huynh et al. |
| 7,122,976 B1 | 10/2006 | Null et al. |
| 7,188,967 B2 | 3/2007 | Dalton et al. |
| 7,190,121 B2 | 3/2007 | Rose et al. |
| 7,196,477 B2 | 3/2007 | Richmond |
| 7,239,087 B2 | 7/2007 | Ball |
| 7,252,385 B2 | 8/2007 | Engle et al. |
| 7,258,464 B2 | 8/2007 | Morris et al. |
| 7,270,441 B2 | 9/2007 | Fiene |
| 7,281,820 B2 | 10/2007 | Bayat et al. |
| 7,294,973 B2 | 11/2007 | Takahama et al. |
| 7,314,291 B2 | 1/2008 | Tain et al. |
| 7,317,403 B2 | 1/2008 | Grootes et al. |
| 7,322,714 B2 | 1/2008 | Barnett et al. |
| 7,330,568 B2 | 2/2008 | Nagaoka et al. |
| 7,339,323 B2 | 3/2008 | Bucur |
| 7,339,471 B1 | 3/2008 | Chan et al. |
| 7,405,524 B2 | 7/2008 | Null et al. |
| 7,438,440 B2 | 10/2008 | Dorogi |
| 7,440,280 B2 | 10/2008 | Shuy |
| 7,468,723 B1 | 12/2008 | Collins |
| 7,524,089 B2 | 4/2009 | Park |
| 7,538,499 B2 | 5/2009 | Ashdown |
| 7,547,113 B2 | 6/2009 | Lee |
| 7,559,674 B2 | 7/2009 | He et al. |
| 7,564,198 B2 | 7/2009 | Yamamoto et al. |
| 7,569,802 B1 | 8/2009 | Mullins |
| 7,578,596 B2 | 8/2009 | Martin |
| 7,578,597 B2 | 8/2009 | Hoover et al. |
| 7,627,372 B2 | 12/2009 | Vaisnys et al. |
| 7,631,324 B2 | 12/2009 | Buonasera et al. |
| 7,633,463 B2 | 12/2009 | Negru |
| 7,638,743 B2 | 12/2009 | Bartol et al. |
| 7,677,753 B1 | 3/2010 | Wills |
| 7,688,002 B2 | 3/2010 | Ashdown et al. |
| 7,688,222 B2 | 3/2010 | Peddie et al. |
| 7,702,135 B2 | 4/2010 | Hill et al. |
| 7,703,951 B2 | 4/2010 | Piepgras et al. |
| 7,746,003 B2 | 6/2010 | Verfuerth et al. |
| D621,410 S | 8/2010 | Verfuerth et al. |
| D621,411 S | 8/2010 | Verfuerth et al. |
| 7,798,669 B2 | 9/2010 | Trojanowski et al. |
| 7,804,200 B2 | 9/2010 | Flaherty |
| 7,828,463 B1 | 11/2010 | Willis |
| 7,834,922 B2 | 11/2010 | Kurane |
| 7,932,535 B2 | 4/2011 | Mahalingam et al. |
| 7,940,191 B2 | 5/2011 | Hierzer |
| 7,952,609 B2 | 5/2011 | Simerly et al. |
| 7,960,919 B2 | 6/2011 | Furukawa |
| 7,983,817 B2 | 7/2011 | Breed |
| 7,985,005 B2 | 7/2011 | Alexander et al. |
| 8,100,552 B2 | 1/2012 | Spero |
| 8,118,456 B2 | 2/2012 | Reed et al. |
| 8,143,769 B2 | 3/2012 | Li |
| 8,174,212 B2 | 5/2012 | Tziony et al. |
| 8,207,830 B2 | 6/2012 | Rutjes et al. |
| 8,290,710 B2 | 10/2012 | Cleland et al. |
| 8,334,640 B2 | 12/2012 | Reed et al. |
| 8,344,665 B2 | 1/2013 | Verfuerth et al. |
| 8,376,583 B2 | 2/2013 | Wang et al. |
| 8,378,563 B2 | 2/2013 | Reed et al. |
| 8,395,329 B2 | 3/2013 | Jutras et al. |
| 8,445,826 B2 | 5/2013 | Verfuerth |
| 8,476,565 B2 | 7/2013 | Verfuerth |
| 8,508,137 B2 | 8/2013 | Reed |
| 8,541,950 B2 | 9/2013 | Reed |
| 8,586,902 B2 | 11/2013 | Verfuerth |
| 8,604,701 B2 | 12/2013 | Verfuerth et al. |
| 8,610,358 B2 | 12/2013 | Reed |
| 8,629,621 B2 | 1/2014 | Reed |
| 8,749,635 B2 | 6/2014 | Högasten et al. |
| 8,764,237 B2 | 7/2014 | Wang et al. |
| 8,779,340 B2 | 7/2014 | Verfuerth et al. |
| 8,779,686 B2 | 7/2014 | Jin |
| 8,866,392 B2 | 10/2014 | Chen |
| 8,866,582 B2 | 10/2014 | Verfuerth et al. |
| 8,872,430 B2 | 10/2014 | Yang |
| 8,884,203 B2 | 11/2014 | Verfuerth et al. |
| 8,921,751 B2 | 12/2014 | Verfuerth |
| 9,084,310 B2 | 7/2015 | Bedell et al. |
| 2002/0084767 A1 | 7/2002 | Arai |
| 2003/0016143 A1 | 1/2003 | Ghazarian |
| 2003/0184672 A1 | 10/2003 | Wu et al. |
| 2004/0192227 A1 | 9/2004 | Beach et al. |
| 2005/0117344 A1 | 6/2005 | Bucher et al. |
| 2005/0174762 A1 | 8/2005 | Fogerlic |
| 2005/0231133 A1 | 10/2005 | Lys |
| 2006/0014118 A1 | 1/2006 | Utama |
| 2006/0066264 A1 | 3/2006 | Ishigaki et al. |
| 2006/0098440 A1 | 5/2006 | Allen |
| 2006/0146652 A1 | 7/2006 | Huizi et al. |
| 2006/0208667 A1 | 9/2006 | Lys et al. |
| 2007/0032990 A1 | 2/2007 | Williams et al. |
| 2007/0102033 A1 | 5/2007 | Petrocy |
| 2007/0164689 A1 | 7/2007 | Suzuki |
| 2007/0224461 A1 | 9/2007 | Oh |
| 2007/0225933 A1 | 9/2007 | Shimomura |
| 2008/0043106 A1 | 2/2008 | Hassapis et al. |
| 2008/0062687 A1 | 3/2008 | Behar et al. |
| 2008/0130304 A1 | 6/2008 | Rash et al. |
| 2008/0215279 A1 | 9/2008 | Salsbury et al. |
| 2008/0224623 A1 | 9/2008 | Yu |
| 2008/0232116 A1 | 9/2008 | Kim |
| 2008/0248837 A1 | 10/2008 | Kunkel |
| 2008/0266839 A1 | 10/2008 | Claypool et al. |
| 2009/0046151 A1 | 2/2009 | Nagaoka et al. |
| 2009/0058320 A1 | 3/2009 | Chou et al. |
| 2009/0129067 A1 | 5/2009 | Fan et al. |
| 2009/0153062 A1 | 6/2009 | Guo et al. |
| 2009/0160358 A1 | 6/2009 | Leiderman |
| 2009/0161356 A1 | 6/2009 | Negley et al. |
| 2009/0167203 A1 | 7/2009 | Dahlman et al. |
| 2009/0195179 A1 | 8/2009 | Joseph et al. |
| 2009/0230883 A1 | 9/2009 | Haug |
| 2009/0235208 A1 | 9/2009 | Nakayama et al. |
| 2009/0261735 A1 | 10/2009 | Sibalich et al. |
| 2009/0268023 A1 | 10/2009 | Hsieh |
| 2009/0273290 A1 | 11/2009 | Ziegenfuss |
| 2009/0278479 A1 | 11/2009 | Platner et al. |

(56) References Cited

U.S. PATENT DOCUMENTS

| | | |
|---|---|---|
| 2009/0284155 A1 | 11/2009 | Reed et al. |
| 2009/0315485 A1 | 12/2009 | Verfuerth et al. |
| 2010/0001652 A1 | 1/2010 | Damsleth |
| 2010/0052557 A1 | 3/2010 | Van Der Veen et al. |
| 2010/0096460 A1 | 4/2010 | Carlson et al. |
| 2010/0123403 A1 | 5/2010 | Reed |
| 2010/0164406 A1 | 7/2010 | Kost et al. |
| 2010/0171442 A1 | 7/2010 | Draper et al. |
| 2010/0244708 A1 | 9/2010 | Cheung et al. |
| 2010/0259193 A1 | 10/2010 | Umezawa et al. |
| 2010/0270945 A1 | 10/2010 | Chang et al. |
| 2010/0271802 A1 | 10/2010 | Recker et al. |
| 2010/0277082 A1 | 11/2010 | Reed et al. |
| 2010/0295946 A1 | 11/2010 | Reed et al. |
| 2010/0309310 A1 | 12/2010 | Albright |
| 2010/0328946 A1 | 12/2010 | Borkar et al. |
| 2011/0001626 A1 | 1/2011 | Yip et al. |
| 2011/0006703 A1 | 1/2011 | Wu et al. |
| 2011/0026264 A1 | 2/2011 | Reed et al. |
| 2011/0204845 A1 | 8/2011 | Paparo et al. |
| 2011/0215731 A1 | 9/2011 | Jeong et al. |
| 2011/0221346 A1 | 9/2011 | Lee et al. |
| 2011/0248812 A1 | 10/2011 | Hu et al. |
| 2011/0251751 A1 | 10/2011 | Knight |
| 2011/0310605 A1 | 12/2011 | Renn et al. |
| 2012/0001566 A1 | 1/2012 | Josefowicz et al. |
| 2012/0019971 A1 | 1/2012 | Flaherty et al. |
| 2012/0038490 A1 | 2/2012 | Verfuerth |
| 2012/0119669 A1 | 5/2012 | Melanson et al. |
| 2012/0119682 A1 | 5/2012 | Warton |
| 2012/0143383 A1 | 6/2012 | Cooperrider et al. |
| 2012/0153854 A1 | 6/2012 | Setomoto et al. |
| 2012/0169053 A1 | 7/2012 | Tchoryk, Jr. et al. |
| 2012/0181935 A1 | 7/2012 | Velazquez |
| 2012/0209755 A1 | 8/2012 | Verfuerth et al. |
| 2012/0221154 A1 | 8/2012 | Runge |
| 2012/0224363 A1 | 9/2012 | Van De Ven |
| 2012/0230584 A1 | 9/2012 | Kubo et al. |
| 2012/0242254 A1 | 9/2012 | Kim et al. |
| 2012/0262069 A1 | 10/2012 | Reed |
| 2013/0033183 A1 | 2/2013 | Verfuerth et al. |
| 2013/0049613 A1 | 2/2013 | Reed |
| 2013/0126715 A1 | 5/2013 | Flaherty |
| 2013/0131882 A1 | 5/2013 | Verfuerth et al. |
| 2013/0141000 A1 | 6/2013 | Wei et al. |
| 2013/0141010 A1 | 6/2013 | Reed et al. |
| 2013/0154488 A1 | 6/2013 | Sadwick et al. |
| 2013/0163243 A1 | 6/2013 | Reed |
| 2013/0193857 A1 | 8/2013 | Tlachac et al. |
| 2013/0229518 A1 | 9/2013 | Reed et al. |
| 2013/0235202 A1 | 9/2013 | Nagaoka et al. |
| 2013/0249429 A1 | 9/2013 | Woytowitz et al. |
| 2013/0249479 A1 | 9/2013 | Partovi |
| 2013/0307418 A1 | 11/2013 | Reed |
| 2013/0313982 A1 | 11/2013 | Reed |
| 2013/0340353 A1 | 12/2013 | Whiting et al. |
| 2014/0001961 A1 | 1/2014 | Anderson et al. |
| 2014/0028198 A1 | 1/2014 | Reed et al. |
| 2014/0055990 A1 | 2/2014 | Reed |
| 2014/0062312 A1 | 3/2014 | Reed |
| 2014/0062341 A1 | 3/2014 | Reed et al. |
| 2014/0070964 A1 | 3/2014 | Rupprath et al. |
| 2014/0078308 A1 | 3/2014 | Verfuerth |
| 2014/0097759 A1 | 4/2014 | Verfuerth et al. |
| 2014/0203714 A1 | 7/2014 | Zhang et al. |
| 2014/0244044 A1 | 8/2014 | Davis et al. |
| 2014/0265894 A1 | 9/2014 | Weaver |
| 2014/0265897 A1 | 9/2014 | Taipale et al. |
| 2014/0313719 A1 | 10/2014 | Wang et al. |
| 2015/0015716 A1 | 1/2015 | Reed et al. |
| 2015/0077019 A1 | 3/2015 | Reed et al. |
| 2015/0208479 A1 | 7/2015 | Radermacher et al. |
| 2015/0280782 A1 | 10/2015 | Arbinger et al. |
| 2015/0312983 A1 | 10/2015 | Hu et al. |

FOREIGN PATENT DOCUMENTS

| | | |
|---|---|---|
| EP | 2 559 937 A1 | 2/2013 |
| EP | 1 459 600 B1 | 2/2014 |
| EP | 2 781 138 A1 | 9/2014 |
| FR | 2 883 306 A1 | 9/2006 |
| JP | 6-335241 A | 12/1994 |
| JP | 2001-333420 A | 11/2001 |
| JP | 2004-279668 A | 10/2004 |
| JP | 2004-320024 A | 11/2004 |
| JP | 2004-349065 A | 12/2004 |
| JP | 2005-93171 A | 4/2005 |
| JP | 2005-198238 A | 7/2005 |
| JP | 2005-310997 A | 11/2005 |
| JP | 2006-179672 A | 7/2006 |
| JP | 2006-244711 A | 9/2006 |
| JP | 2008-59811 A | 3/2008 |
| JP | 2008-509538 A | 3/2008 |
| JP | 2008-130523 A | 6/2008 |
| JP | 2008-159483 A | 7/2008 |
| JP | 2008-177144 A | 7/2008 |
| JP | 2008-529177 A | 7/2008 |
| JP | 2008-535279 A | 8/2008 |
| JP | 2010-504628 A | 2/2010 |
| KR | 2005078403 A | 8/2005 |
| KR | 10-2006-0086254 A | 7/2006 |
| KR | 10-2008-0100140 A | 11/2008 |
| KR | 10-2009-0042400 A | 4/2009 |
| KR | 10-0935736 B1 | 1/2010 |
| KR | 20-2010-0007230 U | 7/2010 |
| KR | 10-1001276 B1 | 12/2010 |
| KR | 10-1044224 B1 | 6/2011 |
| KR | 10-1150876 B1 | 5/2012 |
| WO | 02/076068 A1 | 9/2002 |
| WO | 03/056882 A1 | 7/2003 |
| WO | 2005/003625 A1 | 1/2005 |
| WO | 2006/057866 A2 | 6/2006 |
| WO | 2007/023454 A1 | 3/2007 |
| WO | 2007/036873 A2 | 4/2007 |
| WO | 2008/030450 A2 | 3/2008 |
| WO | 2008/034242 A1 | 3/2008 |
| WO | 2009/040703 A2 | 4/2009 |
| WO | 2011/063302 A2 | 5/2011 |
| WO | 2011/129309 A1 | 10/2011 |
| WO | 2012/006710 A1 | 1/2012 |
| WO | 2012/142115 A2 | 10/2012 |
| WO | 2013/074900 A1 | 5/2013 |
| WO | 2014/018773 A1 | 1/2014 |
| WO | 2014/039683 A1 | 3/2014 |
| WO | 2014/078854 A | 5/2014 |

OTHER PUBLICATIONS

Reed et al., "Apparatus and Method of Operating a Luminaire," Office Action mailed Dec. 22, 2014, for U.S. Appl. No. 13/558,191, 17 pages.

Reed, "Adjustable Output Solid-State Lighting Device," Office Acton mailed Jan. 2, 2015, for U.S. Appl. No. 13/707,123, 24 pages.

Reed, "Electronic Control to Regulate Power for Solid-State Lighting and Methods Thereof," Amendment filed Dec. 15, 2014, for U.S. Appl. No. 12/619,535, 21 pages.

Reed, "Luminaire With Ambient Sensing and Autonomous Control Capabilities," Office Action mailed Dec. 17, 2014, for U.S. Appl. No. 13/786,332, 20 pages.

Extended European Search Report, dated Oct. 15, 2015, for corresponding European Application No. 12825132.9-1802, 5 pages.

Extended European Search Report, dated Sep. 28, 2015, for corresponding European Application No. 12850159.0-1802, 6 pages.

Extended European Search Report dated Oct. 21, 2015, for corresponding EP Application No. 13835001.2-1802, 7 pages.

Extended European Search Report dated Jan. 4, 2016, for corresponding EP Application No. 13823055.2-1802, 7 pages.

Korean Office Action with English Translation, dated Nov. 18, 2015, for corresponding KR Application No. 10-2011-7014088, 14 pages.

Reed et al., "Long-Range Motion Detection for Illumination Control," Office Action mailed Sep. 17, 2015, for U.S. Appl. No. 14/500,512, 17 pages.

(56) References Cited

OTHER PUBLICATIONS

Reed et al., "Long-Range Motion Detection for Illumination Control," Amendment filed Dec. 10, 2015, for U.S. Appl. No. 14/500,512, 18 pages.
Reed et al., "Long-Range Motion Detection for Illumination Control," Office Action mailed Mar. 4, 2016, for U.S. Appl. No. 14/500,512, 18 pages.
Reed et al., "Systems and Methods That Employ Object Recognition," Office Action mailed Dec. 7, 2015, for U.S. Appl. No. 13/411,321, 47 pages.
Reed et al., "Systems and Methods That Employ Object Recognition," Amendment filed Mar. 7, 2016, for U.S. Appl. No. 13/411,321, 16 pages.
Reed, "Adjustable Output Solid-State Lighting Device," Office Action mailed Oct. 5, 2015, for U.S. Appl. No. 13/707,123, 24 pages.
Reed, "Adjustable Output Solid-State Lighting Device," Amendment filed Jan. 8, 2016, for U.S. Appl. No. 13/707,123, 11 pages.
Reed, "Adjustable Output Solid-State Lighting Device," Notice of Allowance mailed Feb. 25, 2016, for U.S. Appl. No. 13/707,123, 9 pages.
Reed, "High Efficiency Power Controller for Luminaire," Office Action mailed Sep. 10, 2015, for U.S. Appl. No. 14/546,354, 15 pages.
Reed, "High Efficiency Power Controller for Luminaire," Amendment filed Feb. 9, 2016, for U.S. Appl. No. 14/546,354, 11 pages.
Reed, "Low Power Photocontrol for Luminaire," U.S. Appl. No. 14/994,569, filed Jan. 13, 2016, 36 pages.
Reed, "Low Power Photocontrol for Luminaire," U.S. Appl. No. 14/844,944, filed Sep. 3, 2015, 45 pages.
Reed et al., "Luminaire With Adjustable Illumination Pattern," U.S. Appl. No. 14/939,856, filed Nov. 12, 2015, 69 pages.
Reed, "Luminaire With Switch-Mode Converter Power Monitoring," Notice of Allowance mailed Nov. 18, 2015, for U.S. Appl. No. 14/074,166, 9 pages.
Reed, "Solid State Lighting, Drive Circuit and Method of Driving Same," Notice of Allowance Mailed Aug. 4, 2015, for U.S. Appl. No. 13/875,000, 10 pages.
Reed, "Systems, Methods, and Apparatuses for Using a High Current Switching Device as a Logic Level Sensor," Notice of Allowance for U.S. Appl. No. 14/179,737, mailed Nov. 6, 2015, 9 pages.
"Lcd Backlight I/O Ports and Power Protection Circuit Design," dated May 2, 2011, retrieved Jun. 10, 2011, retrieved from http://www.chipoy.info/gadgets/lcd-backlight-i-o-ports-and-power-pr . . . , 4 pages.
EE Herald, "Devices to protect High brightness LED from ESD," dated Mar. 16, 2009, retrieved Jun. 10, 2011, retrieved from http://www.eeherald.com/section/new-products/np100779.html, 1 page.
Fairchild Semiconductor, "LED Application Design Guide Using Half-Bridge LLC Resonant Converter for 100W Street Lighting," AN-9729, Fairchild Semiconductor Corporation, Rev. 1.0.0, Mar. 22, 2011, 17 pages.
Huang, "Designing an LLC Resonant Half-Bridge Power Converter," 2010 Texas Instruments Power Supply Design Seminar, SEM1900, Topic 3, TI Literature No. SLUP263, Copyright 2010, 2011, Texas Instruments Incorporated, 28 pages.
International Search Report, mailed Jul. 9, 2009 for PCT/US2009/043171, 5 pages.
International Search Report, mailed Jun. 21, 2010 for PCT/US2009/064625, 3 pages.
International Search Report, mailed Dec. 13, 2010 for PCT/US2010/035649, 3 pages.
International Search Report, mailed Dec. 15, 2010 for PCT/US2010/035658, 3 pages.
International Search Report, mailed Dec. 28, 2010 for PCT/US2010/035651, 3 pages.
International Search Report, mailed Sep. 30, 2011 for PCT/US2011/021359, 3 pages.
International Search Report, mailed Oct. 8, 2012 for PCT/US2012/033059, 3 pages.
International Search Report, mailed Jan. 14, 2013 for PCT/US2012/052009, 3 pages.
International Search Report, mailed Feb. 27, 2013 for PCT/US2012/065476, 3 pages.
International Search Report, mailed Nov. 19, 2013 for PCT/US2013/052092, 4 pages.
International Search Report, mailed Dec. 30, 2013 for PCT/US2013/058266, 3 pages.
International Search Report, mailed Feb. 26, 2014, for PCT/US2013/070794, 3 pages.
Kadirvel et al., "Self-Powered, Ambient Light Sensor Using bq25504," Texas Instruments, Application Report, SLUA629—Jan. 2012, 6 pages.
Littelfuse, "Application Note: Protecting LEDs in Product Designs," 2009, 2 pages.
Panasonic Electronic Components, "LED Lighting Solutions," 2009, 6 pages.
Poplawski, "Exploring Flicker & LEDs," 2010 DOE SSL Market Introduction Workshop, U.S. Department of Energy, Jul. 22, 2010, 16 pages.
Reed et al., "Adjustable Output Solid-State Lamp With Security Features," U.S. Appl. No. 61/561,616, filed Nov. 18, 2011, 33 pages.
Reed et al., "Adjustable Output Solid-State Lamp With Security Features," Office Action mailed Feb. 27, 2014, for U.S. Appl. No. 13/679,687, 11 pages.
Reed et al., "Apparatus, Method to Change Light Source Color Temperature With Reduced Optical Filtering Losses," U.S. Appl. No. 61/295,519, filed Jan. 15, 2010, 35 pages.
Reed et al., "Apparatus, Method to Change Light Source Color Temperature With Reduced Optical Filtering Losses," U.S. Appl. No. 61/406,490, filed Oct. 25, 2010, 46 pages.
Reed et al., "Apparatus, Method to Enhance Color Contrast in Phosphor-Based Solid State Lights," U.S. Appl. No. 61/534,722, filed Sep. 14, 2011, 53 pages.
Reed et al., "Electrically Isolated Heat Sink for Solid-State Light," U.S. Appl. No. 61/229,435, filed Jul. 29, 2009, 29 pages.
Reed et al., "Gas-Discharge Lamp Replacement," U.S. Appl. No. 61/052,924, filed May 13, 2008, 32 pages.
Reed et al., "Gas-Discharge Lamp Replacement With Passive Cooling," U.S. Appl. No. 61/174,913, filed May 1, 2009, 29 pages.
Reed et al., "Long-Range Motion Detection for Illumination Control," U.S. Appl. No. 61/180,017, filed May 20, 2009, 32 pages.
Reed et al., "Long-Range Motion Detection for Illumination Control," Office Action mailed Dec. 21, 2012, for U.S. Appl. No. 12/784,080, 26 pages.
Reed et al., "Long-Range Motion Detection for Illumination Control," Amendment filed Apr. 22, 2013, for U.S. Appl. No. 12/784,080, 17 pages.
Reed et al., "Long-Range Motion Detection for Illumination Control," Office Action mailed Jul. 22, 2013, for U.S. Appl. No. 12/784,080, 29 pages.
Reed et al., "Long-Range Motion Detection for Illumination Control," Amendment filed Sep. 27, 2013, for U.S. Appl. No. 12/784,080, 20 pages.
Reed et al., "Long-Range Motion Detection for Illumination Control," Office Action mailed Jan. 30, 2014, for U.S. Appl. No. 12/784,080, 26 pages.
Reed et al., "Low-Profile Pathway Illumination System," U.S. Appl. No. 61/051,619, filed May 8, 2008, 25 pages.
Reed et al., "Low-Profile Pathway Illumination System," Office Action, dated May 5, 2011, for U.S. Appl. No. 12/437,472, 24 pages.
Reed et al., "Low-Profile Pathway Illumination System," Amendment filed Jul. 29, 2011, for U.S. Appl. No. 12/437,472, 19 pages.
Reed et al., "Low-Profile Pathway Illumination System," Notice of Allowance, dated Oct. 14, 2011, for U.S. Appl. No. 12/437,472, 9 pages.
Reed et al., "Remotely Adjustable Solid-State Lamp," U.S. Appl. No. 61/641,781, filed May 2, 2012, 65 pages.
Reed et al., "Remotely Adjustable Solid-State Lamp," U.S. Appl. No. 13/875,130, filed May 1, 2013, 65 pages.

(56) References Cited

OTHER PUBLICATIONS

Reed et al., "Turbulent Flow Cooling for Electronic Ballast," U.S. Appl. No. 61/088,651, filed Aug. 13, 2008, 23 pages.
Reed, "Adjustable Output Solid-State Lighting Device," U.S. Appl. No. 61/567,308, filed Dec. 6, 2011, 49 pages.
Reed, "Ambient Light Control in Solid State Lamps and Luminaires," U.S. Appl. No. 61/933,733, filed Jan. 30, 2014, 8 pages.
Reed, "Apparatus and Method of Energy Efficient Illumination," U.S. Appl. No. 61/333,983, filed May 12, 2010, 57 pages.
Reed, "Apparatus and Method of Energy Efficient Illumination," Office Action mailed Dec. 5, 2012, for U.S. Appl. No. 12/784,091, 18 pages.
Reed, "Apparatus and Method of Energy Efficient Illumination," Amendment filed Apr. 4, 2013, for U.S. Appl. No. 12/784,091, 15 pages.
Reed, "Apparatus and Method of Energy Efficient Illumination," Office Action mailed Apr. 24, 2013, for U.S. Appl. No. 12/784,091, 12 pages.
Reed, "Apparatus and Method of Energy Efficient Illumination," Amendment filed May 14, 2013, for U.S. Appl. No. 12/784,091, 9 pages.
Reed, "Apparatus and Method of Energy Efficient Illumination," Notice of Allowance mailed May 23, 2013, for U.S. Appl. No. 12/784,091, 6 pages.
Reed, "Apparatus and Method of Energy Efficient Illumination," U.S. Appl. No. 61/346,263, filed May 19, 2010, 67 pages.
Reed, "Apparatus and Method of Energy Efficient Illumination," Office Action mailed Dec. 5, 2012, for U.S. Appl. No. 12/784,093, 13 pages.
Reed, "Apparatus and Method of Energy Efficient Illumination," Amendment filed Apr. 2, 2013, for U.S. Appl. No. 12/784,093, 13 pages.
Reed, "Apparatus and Method of Energy Efficient Illumination," Notice of Allowance mailed Apr. 12, 2013, for U.S. Appl. No. 12/784,093, 9 pages.
Reed, "Apparatus and Method of Energy Efficient Illumination," Office Action mailed Nov. 27, 2013, for U.S. Appl. No. 13/943,537, 8 pages.
Reed, "Apparatus and Method of Energy Efficient Illumination Using Received Signals," Office Action mailed Oct. 1, 2013, for U.S. Appl. No. 13/085,301, 11 pages.
Reed, "Apparatus and Method of Energy Efficient Illumination Using Received Signals," Amendment filed Jan. 2, 2014, for U.S. Appl. No. 13/085,301, 26 pages.
Reed, "Electronic Control to Regulate Power for Solid-State Lighting and Methods Thereof," U.S. Appl. No. 61/115,438, filed Nov. 17, 2008, 51 pages.
Reed, "Electronic Control to Regulate Power for Solid-State Lighting and Methods Thereof," U.S. Appl. No. 61/154,619, filed Feb. 23, 2009, 62 pages.
Reed, "Electronic Control to Regulate Power for Solid-State Lighting and Methods Thereof," Office Action mailed Feb. 28, 2013, for U.S. Appl. No. 12/619,535, 17 pages.
Reed, "Electronic Control to Regulate Power for Solid-State Lighting and Methods Thereof," Amendment filed May 24, 2013, for U.S. Appl. No. 12/619,535, 21 pages.
Reed, "Electronic Control to Regulate Power for Solid-State Lighting and Methods Thereof," Office Action mailed Jul. 30, 2013, for U.S. Appl. No. 12/619,535, 15 pages.
Reed, "Electronic Control to Regulate Power for Solid-State Lighting and Methods Thereof," Amendment filed Oct. 30, 2013, for U.S. Appl. No. 12/619,535, 5 pages.
Reed, "Electrostatic Discharge Protection for Luminaire," Office Action mailed Mar. 15, 2013, for U.S. Appl. No. 13/212,074, 11 pages.
Reed, "Electrostatic Discharge Protection for Luminaire," Amendment filed Jun. 17, 2013, for U.S. Appl. No. 13/212,074, 11 pages.
Reed, "Electrostatic Discharge Protection for Luminaire," Notice of Allowance mailed Sep. 12, 2013, for U.S. Appl. No. 13/212,074, 6 pages.
Reed, "High Efficiency Power Controller for Luminaire," U.S. Appl. No. 61/905,699, filed Nov. 18, 2013, 5 pages.
Reed, "Luminaire With Ambient Sensing and Autonomous Control Capabilities," U.S. Appl. No. 61/728,150, filed Nov. 19, 2012, 83 pages.
Reed, "Luminaire With Ambient Sensing and Autonomous Control Capabilities," U.S. Appl. No. 13/786,332, filed Mar. 5, 2013, 86 pages.
Reed, "Luminaire With Atmospheric Electrical Activity Detection and Visual Alert Capabilities," U.S. Appl. No. 61/694,159, filed Aug. 28, 2012, 52 pages.
Reed, "Luminaire With Switch-Mode Converter Power Monitoring," U.S. Appl. No. 61/723,675, filed Nov. 7, 2012, 73 pages.
Reed, "Luminaire With Switch-Mode Converter Power Monitoring," U.S. Appl. No. 14/074,166, filed Nov. 7, 2013, 73 pages.
Reed, "Photocontrol for Luminaire Consumes Very Low Power," U.S. Appl. No. 61/849,841, filed Jul. 24, 2013, 41 pages.
Reed, "Resonant Network for Reduction of Flicker Perception in Solid State Lighting Systems," U.S. Appl. No. 61/527,029, filed Aug. 24, 2011, 41 pages.
Reed, "Solid State Hospitality Lamp," U.S. Appl. No. 61/692,619, filed Aug. 23, 2012, 32 pages.
Reed, "Solid State Lighting, Drive Circuit and Method of Driving Same," U.S. Appl. No. 61/640,963, filed May 1, 2012, 24 pages.
Reed, "Systems, Methods, and Apparatuses for Using a High Current Switching Device as a Logic Level Sensor," U.S. Appl. No. 61/764,395, filed Feb. 13, 2013, 48 pages.
Reed, "Systems, Methods, and Apparatuses for Using a High Current Switching Device as a Logic Level Sensor," U.S. Appl. No. 14/179,737, filed Feb. 13, 2014, 48 pages.
Renesas Electronics, "Zener Diodes for Surge Absorption—Applications of high-intensity LED," Apr. 2010, 1 page.
Renn et al., "Solid State Lighting Device and Method Employing Heat Exchanger Thermally Coupled Circuit Board," U.S. Appl. No. 61/357,421, filed Jun. 22, 2010, 49 pages.
Tyco Electronics, "Circuit Protection," retrieved Jun. 10, 2011, retrieved from http://www.tycoelectronics.com/en/products/circuit-protection.html, 2 pages.
Written Opinion, mailed Jul. 9, 2009 for PCT/US2009/043171, 8 pages.
Written Opinion, mailed Jun. 21, 2010 for PCT/US2009/064625, 5 pages.
Written Opinion, mailed Dec. 13, 2010 for PCT/US2010/035649, 4 pages.
Written Opinion, mailed Dec. 15, 2010 for PCT/US2010/035658, 3 pages.
Written Opinion, mailed Dec. 28, 2010 for PCT/US2010/035651, 3 pages.
Written Opinion, mailed Sep. 30, 2011 for PCT/US2011/021359, 4 pages.
Written Opinion, mailed Oct. 8, 2012 for PCT/US2012/033059, 3 pages.
Written Opinion, mailed Jan. 14, 2013 for PCT/US2012/052009, 5 pages.
Written Opinion, mailed Feb. 27, 2013, for PCT/US2012/065476, 8 pages.
Written Opinion, mailed Nov. 19, 2013 for PCT/US2013/052092, 7 pages.
Written Opinion, mailed Dec. 30, 2013 for PCT/US2013/058266, 8 pages.
Written Opinion, mailed Feb. 26, 2014, for PCT/US2013/070794, 10 pages.
Reed et al., "Apparatus and Method for Schedule Based Operations of a Luminaire," Office Action mailed Mar. 2, 2015, for U.S. Appl. No. 14/552,274, 7 pages.
Reed et al., "Apparatus and Method of Operating a Luminaire," Amendment filed Mar. 19, 2015, for U.S. Appl. No. 13/558,191, 20 pages.
Reed et al., "Systems and Methods That Employ Object Recognition," Office Action mailed Feb. 9, 2015, for U.S. Appl. No. 13/411,321, 40 pages.
Reed, "Adjustable Output Solid-State Lighting Device," Amendment filed Apr. 2, 2015, for U.S. Appl. No. 13/707,123, 14 pages.

(56) References Cited

OTHER PUBLICATIONS

Reed, "Ambient Light Control in Solid State Lamps and Luminaires," Amendment filed Jan. 29, 2015, for U.S. Appl. No. 14/609,168, 12 pages.
Reed, "Ambient Light Control in Solid State Lamps and Luminaires," U.S. Appl. No. 14/609,168, filed Jan. 29, 2015, 77 pages.
Reed, "Low Power Photocontrol for Luminaire," U.S. Appl. No. 62/137,666, filed Mar. 24, 2015, 36 pages.
Reed, "Luminaire With Adjustable Illumination Pattern," U.S. Appl. No. 62/114,826, filed Feb. 11, 2015, 68 pages.
Reed, "Luminaire With Ambient Sensing and Autonomous Control Capabilities," Amendment filed Mar. 13, 2015, for U.S. Appl. No. 13/786,332, 23 pages.
Extended European Search Report, dated Apr. 11, 2016, for corresponding European Application No. 16152644.7, 8 pages.
Extended European Search Report, dated May 3, 2016, for corresponding European Application No. 12771286.7, 9 pages.
Reed, "Electronic Control to Regulate Power for Solid-State Lighting and Methods Thereof," Office Action mailed May 9, 2016 for U.S. Appl. No. 14/806,500, 18 pages.
Reed, "High Efficiency Power Controller for Luminaire," Notice of Allowance mailed Apr. 11, 2016, for U.S. Appl. No. 14/546,354, 5 pages.
Reed, "Low Power Photocontrol for Luminaire," Office Action mailed Apr. 27, 2016, for U.S. Appl. No. 14/844,944, 10 pages.
Reed, "Solid State Hospitality Lamp," Office Action mailed Apr. 15, 2016, for U.S. Appl. No. 13/973,696, 11 pages.
Reed et al., "Apparatus and Method for Schedule Based Operation of a Luminaire," Office Action mailed Mar. 26, 2014, for U.S. Appl. No. 13/604,327, 10 pages.
Reed et al., "Long-Range Motion Detection for Illumination Control," Amendment filed Apr. 28, 2014, for U.S. Appl. No. 12/784,080, 20 pages.
Reed, "Apparatus and Method of Energy Efficient Illumination," Notice of Allowance mailed Apr. 11, 2014, for U.S. Appl. No. 13/943,537, 9 pages.
Reed, "Apparatus and Method of Energy Efficient Illumination Using Received Signals," Office Action mailed Apr. 23, 2014, for U.S. Appl. No. 13/085,301, 12 pages.
Reed, "Electronic Control to Regulate Power for Solid-State Lighting and Methods Thereof," Office Action mailed Mar. 26, 2014, for U.S. Appl. No. 12/619,535, 16 pages.
Reed et al., "Adjustable Output Solid-State Lamp With Security Features," Amendment filed Jun. 24, 2014, for U.S. Appl. No. 13/679,687, 11 pages.
Reed et al., "Apparatus and Method for Schedule Based Operation of a Luminaire," Amendment filed Jun. 24, 2014, for U.S. Appl. No. 13/604,327, 14 pages.
Reed et al., "Apparatus and Method for Schedule Based Operation of a Luminaire," Notice of Allowance mailed Jul. 7, 2014, for U.S. Appl. No. 13/604,327, 8 pages.
Reed et al., "Long-Range Motion Detection for Illumination Control," Notice of Allowance mailed Jun. 20, 2014, for U.S. Appl. No. 12/784,080, 7 pages.
Reed, "Apparatus and Method of Energy Efficient Illumination," U.S. Appl. No. 14/329,508, filed Jul. 11, 2014, 61 pages.
Reed, "Apparatus and Method of Energy Efficient Illumination Using Received Signals," Amendment filed Jul. 23, 2014, for U.S. Appl. No. 13/085,301, 12 pages.
Reed, "Electronic Control to Regulate Power for Solid-State Lighting and Methods Thereof," Amendment filed May 27, 2014, for U.S. Appl. No. 12/619,535, 22 pages.
Reed, "Luminaire With Atmospheric Electrical Activity Detection and Visual Alert Capabilities," Notice of Allowance mailed Jul. 1, 2014, for U.S. Appl. No. 13/786,114, 9 pages.
International Search Report, mailed May 7, 2015, for corresponding International Application No. PCT/US2015/013512, 3 pages.

Reed et al., "Apparatus and Method for Schedule Based Operation of a Luminaire" Amendment filed Jun. 1, 2015, for U.S. Appl. No. 14/552,274, 14 pages.
Reed et al., "Apparatus and Method for Schedule Based Operation of a Luminaire" Notice of Allowance mailed Jun. 19, 2015, for U.S. Appl. No. 14/552,274, 9 pages.
Reed et al., "Apparatus and Method of Operating a Luminaire," Notice of Allowance mailed Apr. 27, 2015, for U.S. Appl. No. 13/558,191, 8 pages.
Reed et al., "Remotely Adjustable Solid-State Lamp," Amendment filed Apr. 1, 2015, for U.S. Appl. No. 13/875,130, 14 pages.
Reed et al., "Remotely Adjustable Solid-State Lamp," Amendment filed Jul. 20, 2015, for U.S. Appl. No. 13/875,130, 15 pages.
Reed et al., "Remotely Adjustable Solid-State Lamp," Notice of Allowance mailed Aug. 12, 2015, for U.S. Appl. No. 13/875,130, 11 pages.
Reed et al., "Remotely Adjustable Solid-State Lamp," Office Action mailed Apr. 21, 2015, for U.S. Appl. No. 13/875,130, 10 pages.
Reed et al., "Systems and Methods That Employ Object Recognition," Amendment filed May 6, 2015, for U.S. Appl. No. 13/411,321, 21 pages.
Reed et al., "Systems and Methods That Employ Object Recognition," Amendment filed Jul. 7, 2015, for U.S. Appl. No. 13/411,321, 21 pages.
Reed, "Electronic Control to Regulate Power for Solid-State Lighting and Methods Thereof," U.S. Appl. No. 14/806,500, filed Jul. 22, 2015.
Reed, "Electronic Control to Regulate Power for Solid-State Lighting and Methods Thereof," Notice of Allowance mailed Apr. 23, 2015, for U.S. Appl. No. 12/619,535, 8 pages.
Reed, "Luminaire With Ambient Sensing and Autonomous Control Capabilities," Office Action mailed May 29, 2015, for U.S. Appl. No. 13/786,332, 7 pages.
Written Opinion, mailed May 7, 2015, for PCT/US2015/013512, 15 pages.
Extended European Search Report, dated Aug. 13, 2014, for corresponding European Application No. 09826926.9, 8 pages.
Reed et al., "Adjustable Output Solid-State Lamp With Security Features," Notice of Allowance mailed Aug. 29, 2014, for U.S. Appl. No. 13/679,687, 9 pages.
Reed et al., "Systems and Methods That Employ Object Recognition," Office Action mailed Aug. 25, 2014, for U.S. Appl. No. 13/411,321, 35 pages.
Reed, "Apparatus and Method of Energy Efficient Illumination," Office Action mailed Aug. 28, 2014, for U.S. Appl. No. 14/329,508, 8 pages.
Reed, "Apparatus and Method of Energy Efficient Illumination Using Received Signals," Notice of Allowance mailed Jul. 30, 2014, for U.S. Appl. No. 13/085,301, 5 pages.
Reed, "Electronic Control to Regulate Power for Solid-State Lighting and Methods Thereof," Office Action mailed Aug. 14, 2014, for U.S. Appl. No. 12/619,535, 16 pages.
International Search Report mailed Nov. 11, 2014, for International Application No. PCT/US2014/047867, 3 pages.
Reed et al., "Systems and Methods That Employ Object Recognition," Amendment filed Nov. 21, 2014, for U.S. Appl. No. 13/411,321, 20 pages.
Reed, "Apparatus and Method of Energy Efficient Illumination," Amendment filed Sep. 30, 2014, for U.S. Appl. No. 14/329,508, 18 pages.
Reed, "Apparatus and Method of Energy Efficient Illumination," Notice of Allowance mailed Nov. 5, 2014, for U.S. Appl. No. 14/329,508, 10 pages.
Reed, "Apparatus and Method of Energy Efficient Illumination Using Received Signals," U.S. Appl. No. 14/557,275, filed Dec. 1, 2014, 92 pages.
Reed, "High Efficiency Power Controller for Luminaire," U.S. Appl. No. 14/546,354, filed Nov. 18, 2014, 33 pages.
Written Opinion mailed Nov. 11, 2014, for International Application No. PCT/US2014/047867, 5 pages.

PHOTOCONTROL FOR LUMINAIRE CONSUMES VERY LOW POWER

BACKGROUND

1. Technical Field

The present disclosure generally relates to the field of photocontrols and, more particularly, low-power photocontrols used with luminaires.

2. Description of the Related Art

A photocontrol is a device that switches or controls electrical loads based on ambient light levels. As an example, a photocontrol can be used as a switch that provides electrical power to a luminaire only when detected light levels are below a desired level. Photocontrols used for such luminaires may include photosensors that are electrically and operably coupled to switching devices rated for use at relatively high line voltages (e.g., 90 VAC to 600 VAC) and at relatively high currents (e.g., amperes and higher). For example, a photocontrol for a luminaire may include a photosensor that controls an electro-mechanical relay coupled between a source of electrical power and a control device (e.g., a magnetic or electronic transformer) within the luminaire. The electro-mechanical relay may be configured to be in an electrically continuous state unless a signal from the photosensor is present to supply power to the luminaire. If the photosensor is illuminated with a sufficient amount of light, the photosensor outputs the signal that causes the electro-mechanical relay to switch to an electrically discontinuous state such that no power is supplied to the luminaire.

Conventional photocontrols used with luminaires suffer from a number of drawbacks. For example, such photocontrols may include small power sources that use "capacitive drop" technology to power a circuit of discrete transistors, integrated circuit operational amplifiers, or comparators. Conventional photocontrols using such technology can consume considerable amounts of power when the luminaire is ON and when the luminaire is OFF.

Additionally, a typical electro-mechanical relay used with a photocontrol for a luminaire has a relatively short life span. For example, electro-mechanical relays of conventional photocontrols used with luminaires may be rated to have only 5000 contactor closures with standard loads. Arching caused by high capacitive in-rush currents of electronically ballasted luminaires and inductive "kick back" of magnetically ballasted luminaires can corrode the contactors of the electro-mechanical relays. Additionally, the contactors may include silver or other metal alloys upon which oxides and sulfides may form during normal operation. At line voltage and current, such oxides and sulfides may present a negligible resistance to the passage of current through the contactors. However, at relatively low voltages (e.g., 2V to 24V) and relatively low currents (e.g., microamps) such as those used for digital logic level signaling, the impedance presented by contaminants including oxide and sulfide accumulations can hinder or even prevent the transmission of current through the contactors. Thus, conventional photocontrols for luminaires can be unsuitable for use in applications where the switching of relatively low voltage and relatively low current signals is required, for example, with luminaires that include solid-state light source drivers, for example, light emitting diode (LED) drivers that receive control signals for dimming LED arrays.

In response to the increasing emphasis placed on energy efficiency, many luminaires are being retrofitted with more energy efficient light sources. For example, conventional light sources (e.g., incandescent lights) are being replaced with solid-state light sources (e.g., LED arrays). Circuitry that regulates electrical power supplied to such solid-state light source (e.g., LED drivers) may draw relatively high inrush currents when the light sources are switched on. The inrush currents of electrically ballasted light sources may cause more damage to the contactors of electro-mechanical relays than is caused by the kickback currents of magnetically ballasted light sources. Accordingly, when conventional photocontrols having electro-mechanical relays are used with luminaires having solid-state light sources, the electro-mechanical relays may fail or cease to function reliably well before their rated number of contactor closures.

There is therefore a need for photocontrols that consume very small amounts of power. Additionally, there is a need for photocontrols that can be used reliably over long periods of time with luminaires having solid-state light sources.

BRIEF SUMMARY

A photocontrol apparatus to provide a plurality of control signals to a high-impedance controller input used to control the delivery of power to a load device may be summarized as including: a switch including a first node, a second node, and a third node, the first node electrically, communicably, coupled to a source of electrical power and the third node electrically, communicably coupled to the high-impedance controller input; and a photosensor electrically, communicably, coupled between the second node and the third node, the photosensor operable to at least partially cause a voltage level of the second node with respect to the third node to change when the photosensor outputs current in response to being at least partially illuminated with light, wherein when the voltage level of the second node with respect to the third node is greater than a threshold voltage level, the third node outputs a first control signal, and when the voltage level of the second node with respect to the third node is less than the threshold voltage level, the third node outputs a second control signal different from the first control signal.

The photosensor may be electrically coupled to at least partially cause the voltage level of the second node with respect to the third node to decrease when the photosensor outputs current in response to being at least partially illuminated with light. The photocontrol apparatus may further include a resistive device electrically, communicably, coupled between the second node and the third node, the resistive device being operable to at least partially cause the voltage level of the second node with respect to the third node to change when the photosensor outputs current in response to being at least partially illuminated with light. The resistive device may be electrically in parallel with the photosensor. The resistance of the resistive device may be adjustable. The resistive device may be a potentiometer. The photocontrol apparatus may further include a housing at least partially enclosing the switch and the photosensor, the housing may include a translucent portion and a shutter coupled to the housing, the shutter being moveable to selectively block and unblock at least part of the ambient light passing through the translucent portion. The switch may be a Metal Oxide Semiconductor Field Effect Transistor (MOSFET), wherein the first node is a drain node of the MOSFET, the second node is a gate node of the MOSFET, and the third node is a source node of the MOSFET. The switch may be an n-channel depletion mode MOSFET. The switch may be a p-channel enhancement mode MOSFET. The switch may be a low RDS(on) MOSFET. A cathode of the photosensor may be electrically, communicably, coupled to the second node and an anode of the photosensor may be electrically, communicably, coupled to the third node. A voltage level of the first control signal may be greater than a voltage level of the second control signal. The photocontrol apparatus may further include an output conditioner circuit electrically, communicably, coupled between the third node and the high-impedance controller input, the output conditioner circuit being operable to change a voltage level of the first control signal and a voltage level of the second control signal. The photocontrol apparatus may further include a housing and an optical filter disposed within the housing adjacent a light receiving portion of the photosensor, wherein the optical filter transmits only light incident on the optical filter within a predetermined field of view to the light receiving portion of the photosensor. The housing may be transparent. The optical filter may be a film that may be disposed on the light receiving portion of the photosensor.

A photocontrol apparatus to permit, when in an electrically continuous state, a source of electrical power to provide a power signal to an input of a control device used to control the delivery of power to a load device may be summarized as including: a switch including a first node, a second node, and third node, the first node electrically, communicably, coupled to the source of electrical power and the third node electrically, communicably, coupled to the input of the control device; and a photosensor electrically, communicably, coupled between the second node and the third node, the photosensor operable to at least partially cause a voltage level of the second node with respect to the third node to change when the photosensor outputs current in response to being at least partially illuminated with light, wherein when the voltage level of the second node with respect to the third node is greater than a threshold voltage level, the photocontrol apparatus outputs the power signal, and when the voltage level of the second node with respect to the third node is less than the threshold voltage level, the photocontrol apparatus does not output the power signal.

The photosensor may be operable to at least partially cause the voltage level of the second node with respect to the third node to decrease when the photosensor outputs current in response to being at least partially illuminated with light. The photocontrol apparatus may further include a resistive device electrically, communicably, coupled between the second node and the third node, the resistive device being operable to at least partially cause the voltage level of the second node with respect to the third node to change when the photosensor outputs current in response to being at least partially illuminated with light. The resistive device may be electrically in parallel with the photosensor. A resistance of the resistive device may be adjustable. The resistive device may be a potentiometer. The photocontrol apparatus may further include a housing at least partially enclosing the switch and the photosensor, the housing may include a translucent portion and a shutter coupled to the housing, the shutter being moveable to selectively block and unblock at least part of the translucent portion from ambient light. The switch may be a Metal Oxide Semiconductor Field Effect Transistor (MOSFET), wherein the first node is a drain node of the MOSFET, the second node is a gate node of the MOSFET, and the third node is a source node of the MOSFET. The switch may be an n-channel depletion mode MOSFET. The switch may be a p-channel enhancement mode MOSFET. The switch may be a low RDS(on) MOSFET. A cathode of the photosensor may be electrically, communicably, coupled to the second node and an anode of the photosensor may be electrically, communicably, coupled to the third node. The third node may output the power signal when the voltage level of the second node with respect to the third node is greater than the threshold voltage level. The photocontrol apparatus may further include a relay device electrically, communicably, coupled between the source of electrical power and the input of the control device, the relay device being operable to switch between an electrically continuous state and an electrically discontinuous state based on a signal output from the third node. The relay device may output the power signal when the voltage level of the second node with respect to the third node is greater than the threshold voltage level. The photocontrol apparatus may further include a housing and an optical filter disposed in the housing adjacent a light receiving portion of the photosensor, wherein the optical filter transmits only light incident on the optical filter within a predetermined field of view to the light receiving portion of the photosensor. The housing may be transparent. The optical filter may be a film that may be disposed on the light receiving portion of the photosensor.

A photocontrol circuit may be summarized as including: a switch including a first node, a second node, and a third node, the first node being electrically, communicably, coupled to a source of electrical power and the third node electrically, communicably coupled to a controller input; and a photosensor electrically, communicably, coupled between the second node and the third node; a resistive device electrically, communicably, coupled between the second node and the third node, the resistive device being operable to at least partially cause a voltage level of the second node with respect to the third node to change when the photosensor outputs current in response to being at least partially illuminated with light, wherein when the voltage level of the second node with respect to the third node is greater than a threshold voltage level, the third node outputs a first signal, and when the voltage level of the second node with respect to the third node is less than the threshold voltage level, the third node outputs a second signal different from the first signal.

The switch may be a depletion mode Metal Oxide Semiconductor Field Effect Transistor (MOSFET). The switch may be an n-channel depletion mode MOSFET. The switch may be a Metal Oxide Semiconductor Field Effect Transistor (MOSFET), wherein the first node is a drain node of the MOSFET, the second node is a gate node of the MOSFET, and the third node is a source node of the MOSFET. The photosensor may be operable to at least partially cause the voltage level of the second node with respect to the third node to decrease when the photosensor outputs current in response to being at least partially illuminated with light. A voltage level of the first signal may be greater than a voltage level of the second signal.

A method of providing an electrical power signal to an input of a control device used to control the delivery of power to a load device may be summarized as including: electrically, communicably, coupling a source of the electrical power signal to a first node of a switch; electrically, communicably, coupling a photosensor between a second node of the switch and a third node of the switch; changing a voltage level of the second node with respect to the third node when the photosensor is at least partially illuminated with light; and providing the electrical power signal to the input of the control device when the voltage level of the second node with respect to the third node is greater than a threshold voltage level.

The power signal may not be provided to the input of the control device when the voltage level of the second node with respect to the third node is less than the threshold voltage level. The voltage level of the second node with respect to the third node may be decreased when the photosensor is at least partially illuminated with light. The method may further include electrically, communicably, coupling a resistive device between the second node of the switch and the third node of the switch. The resistive device may be electrically in parallel with the photosensor. The resistance of the resistive device may be adjustable. The method may further include adjusting the resistance of the resistive device. A cathode of the photosensor may be electrically, communicably, coupled to the second node and an anode of the photosensor may be electrically, communicably, coupled to the third node. The method include electrically, communicably, coupling a relay device between the source of the electrical power signal and the input of the control device, and switching the relay device between an electrically continuous state and an electrically discontinuous state based on a signal output from the third node. The relay device may output the power signal when the voltage level of the second node with respect to the third node is greater than the threshold voltage level. The method may further include electrically, communicably, coupling an output conditioner circuit between the third node and the input of the relay device. The method may further include electrically, communicably, coupling an output conditioner circuit between the third node and the input of the control device.

The photosensor may output current only when the photocontrol apparatus is at least partially illuminated with wavelengths of light in a range of about 380 nanometers to about 730 nanometers. The photosensor may output current only when the photocontrol apparatus is at least partially illuminated with human visible wavelengths of light. The voltage level of the second node with respect to the third node may be changed only when the photocontrol apparatus is at least partially illuminated with human visible wavelengths of light. The photocontrol apparatus may further include a housing and an optical filter disposed in the housing adjacent a light receiving portion of the photosensor, wherein the optical filter transmits only light incident on the optical filter within a predetermined field of view to the light receiving portion of the photosensor. The housing may be transparent. The optical filter may be a film that may be disposed on the light receiving portion of the photosensor.

A photocontrol apparatus may be summarized as including: a switch including a first node, a second node, and a third node, wherein the first node of the switch is electrically, communicably coupled to a source of electrical power and the third node of the switch is electrically, communicably coupled to an input of a control device; a comparator including a first power supply node, a second power supply node, a first input node, a second input node, and a power output node, wherein the power output node is electrically, communicably coupled to the second node of the switch and at least one of the first and the second power supply nodes is electrically, communicably coupled to the third node of the switch; and a photosensor electrically, communicably coupled between the second node of the switch and the third node of the switch, the photosensor operable to at least partially cause a voltage level of the first input node with respect to the second input node to change when the photosensor outputs current in response to being at least partially illuminated with light.

When the switch is in a first state and the photosensor causes the voltage level of the first input node to fall below a first threshold voltage level, the comparator may cause the switch to change to a second state, and when the switch is in the second state and the photosensor causes the voltage level of the first input node to rise above a second threshold voltage level, the comparator may cause the switch to change to the first state. The switch may be in the first state when the switch is turned ON, and the switch may be in the second state when the switch is turned OFF. The third node of the switch may output a first control signal when the switch is in the first state, the third node of the switch may output a second control signal when the switch is in the second state. The voltage level of the first control signal may be greater than the voltage level of the second control signal. The photocontrol apparatus may further include a capacitor electrically, communicably coupled between the third node of the switch and the first power supply node. The photocontrol apparatus may further include a reference voltage source electrically, communicably coupled between the third node of the switch and the second input node. The reference voltage source may be a diode. A resistive device may be electrically, communicably coupled between the reference voltage source and the photosensor. The comparator may be an operational amplifier including a negative voltage supply node, a positive voltage supply node, a non-inverting input node, an inverting input node, and a voltage output node, wherein the negative voltage supply node is the first power supply node, the positive voltage supply node is the second power supply node, the non-inverting input node is the first input node, the inverting input node is the second input node, and the voltage output node is the power output node. The photocontrol apparatus may further include: a first resistive device electrically, communicably coupled between the power output node and the first input node; a second resistive device electrically, communicably coupled between the photosensor and the first input node; and a third resistive device electrically, communicably coupled between the first input node and the third node of the switch. The second resistive device and the third resistive device may be included in a potentiometer. The photocontrol apparatus may further include a housing at least partially enclosing the switch and the photosensor, the housing including a translucent portion and a shutter coupled to the housing, the shutter being moveable to selectively block and unblock at least part of the translucent portion from ambient light. The switch may be a Metal Oxide Semiconductor Field Effect Transistor (MOSFET), wherein the first node of the switch is a drain node of the MOSFET, the second node of the switch is a gate node of the MOSFET, and the third node of the switch is a source node of the MOSFET. The switch may be an n-channel depletion mode MOSFET. The switch may be a p-channel enhancement mode MOSFET. The switch may be a low RDS(on) MOSFET. The photosensor may output current only when the photocontrol apparatus is at least partially illuminated with human visible wavelengths of light. The third node of the switch may output a power signal to the input of the control device when the switch is in the first state, and the third node of the switch may not output the power signal to the input of the control device when the switch is in the second state. The photocontrol apparatus may further include a relay device electrically, communicably coupled between a source of electrical power and the input of the control device, the relay device being operable to switch between an electrically continuous state and an electrically discontinuous state based on a signal output from the third node of the switch. The relay device may output a power signal to the input of the control device when the switch is in the first state, and the relay device may not output the power signal to the input of the control device when the switch is in the second state. The photocontrol apparatus may further include an optical filter adjacent a light receiving portion of the photosensor, the optical filter including a translucent portion and at least one opaque portion disposed between the translucent portion and the light receiving portion of the photosensor, the optical filter transmitting only light incident on the translucent portion that is within a predetermined field of view to the light receiving portion of the photosensor. The optical filter may be a film that may be disposed on the light receiving portion of the photosensor. The photocontrol apparatus may further include a transparent housing enclosing the optical filter and the photosensor.

A method may be summarized as including: electrically, communicably, coupling a first node of a switch to a source of electrical power; electrically, communicably, coupling a photosensor between a second node of the switch and a third node of the switch; electrically, communicably coupling the third node of the switch to an input of a control device; electrically, communicably, coupling a comparator between the photosensor and the switch, at least a first power supply node of the comparator being coupled to the third node of the switch; and at least partially causing a voltage level of a first input node of the comparator with respect to a second input node of the comparator to change when the photosensor outputs current in response to being at least partially illuminated with light.

When the switch is in a first state and the photosensor causes the voltage level of the first input node to rise above the voltage level of the second input node, the switch may be caused to change to a second state; and when the switch is in the second state and the photosensor causes the voltage level of the first input node to fall below the voltage level of the second input node, the switch may be caused to change to the first state. The switch may be in the first state when the switch is turned ON, and the switch may be in the second state when the switch is turned OFF. The method may further include outputting a first control signal from the third node of the switch when the switch is in the first state; and outputting a second control signal from the third node of the switch when the switch is in the second state. The voltage level of the first control signal may be greater than the voltage level of the second control signal. The method may further include electrically, communicably coupling a capacitor between the third node of the switch and a first power supply node of the comparator. The method may further include electrically, communicably coupling a reference voltage source between the third node of the switch and the second input node of the comparator. The reference voltage source may be a diode. The method may further include electrically, communicably coupling a resistive device between the reference voltage source and the photosensor. The comparator may be an operational amplifier including a negative voltage supply node, a positive voltage supply node, a non-inverting input node, an inverting input node, and a voltage output node, and wherein the negative voltage supply node of the operational amplifier is the first power supply node of the comparator, the positive voltage supply node of the operational amplifier is a second power supply node of the comparator, the non-inverting input node of the operational amplifier is the first input node of the comparator, the inverting input node of the operational amplifier is the second input node of the comparator, and the voltage output node of the operational amplifier is a power output node of the comparator. The method may further include: electrically, communicably coupling a first resistive device between a power output node of the comparator and the first input node of the comparator; electrically, communicably coupling a second resistive device between the photosensor and the first input node of the comparator; and electrically, communicably coupling a third resistive device between the first input node of the comparator and the third node of the switch. The second resistive device and the third resistive device may be included in a potentiometer. The switch may be a Metal Oxide Semiconductor Field Effect Transistor (MOSFET), the first node of the switch is a drain node of the MOSFET, wherein the second node of the switch is a gate node of the MOSFET, and the third node of the switch is a source node of the MOSFET. The switch may be an n-channel depletion mode MOSFET. The switch may be a p-channel enhancement mode MOSFET. The switch may be a low RDS(on) MOSFET. The voltage level of the first input node of the comparator with respect to the second input node of the comparator may be changed only when the photocontrol apparatus is at least partially illuminated with human visible wavelengths of light. The third node of the switch may output a power signal to the input of the control device when the switch is in the first state, and the third node of the switch may not output the power signal to the input of the control device when the switch is in the second state. The method may further include electrically, communicably coupling a relay device between the source of electrical power and the input of the control device, the relay device being operable to switch between an electrically continuous state and an electrically discontinuous state based on a signal output from the third node of the switch. The relay device may output a power signal to the input of the control device when the switch is in the first state, and the relay device may not output the power signal to the input of the control device when the switch is in the second state. The method may further include providing an optical filter adjacent a light receiving portion of the photosensor, the optical filter including a translucent portion and at least one opaque portion disposed between the translucent portion and the light receiving portion of the photosensor, the optical filter transmitting only light incident on the translucent portion that is within a predetermined field of view to the light receiving portion of the photosensor. The optical filter may be a film that may be disposed on the light receiving portion of the photosensor. The method may further include enclosing the optical filter and the photosensor in a transparent housing.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with lighting systems, for example power converters, thermal management structures and subsystems, and/or solid state lights have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

As used in the specification and the appended claims, references are made to a "node" or "nodes." It is understood that a node may be a pad, a pin, a junction, a connector, a wire, or any other point recognizable by one of ordinary skill in the art as being suitable for making an electrical connection within an integrated circuit, on a circuit board, in a chassis or the like.

The headings and Abstract of the Disclosure provided herein are for convenience only and do not interpret the scope or meaning of the embodiments.

Figure 1:
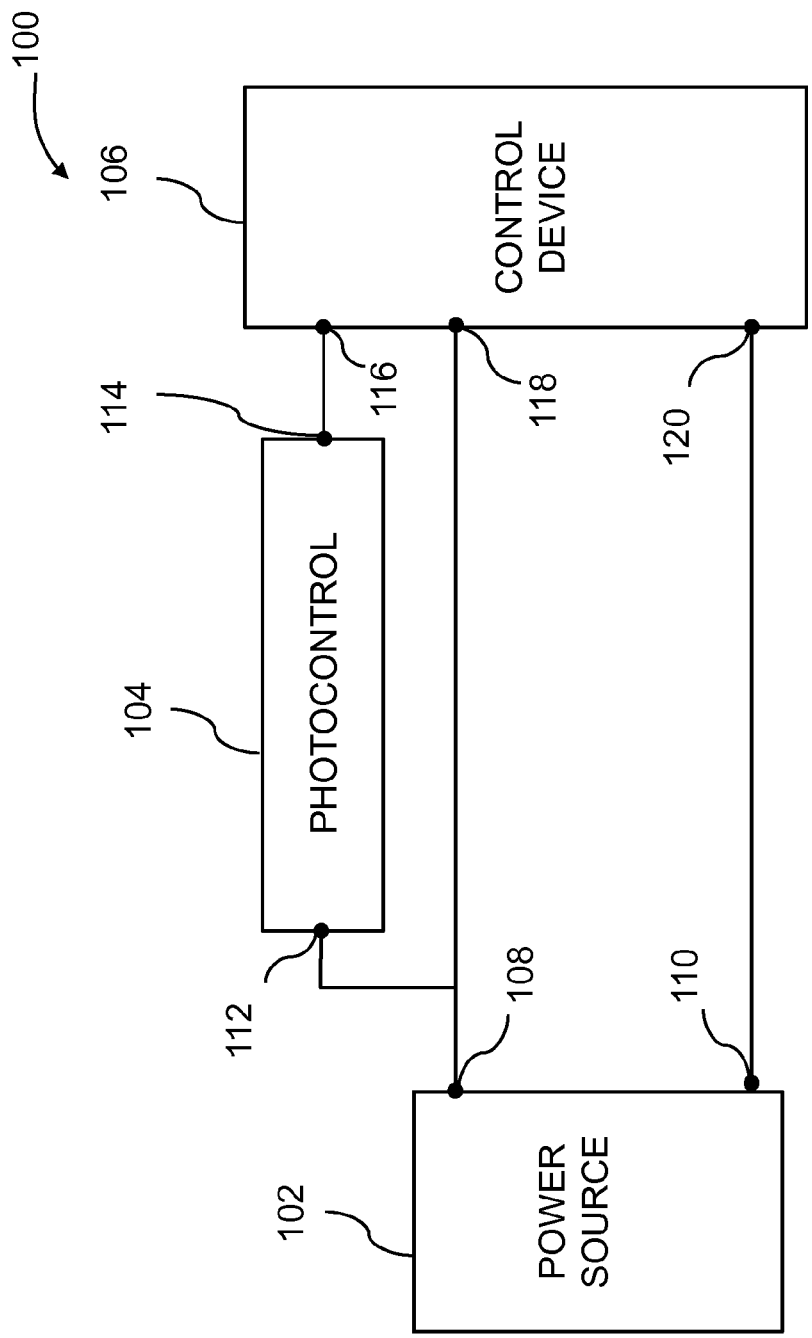
FIG. 1 is a block diagram of a control system, according to one illustrated embodiment.

FIG. 1 shows a control system 100, according to one illustrated embodiment. The description of FIG. 1 provides an overview of the structure and operation of the control system 100. A power source 102 (e.g., mains power) provides electrical power to a photocontrol apparatus 104 and a control device 106, for example, using electrically conductive wires. More particularly, the power source 102 provides line voltage from node 108, which is electrically coupled to node 112 of the photocontrol apparatus 104 and to node 118 of the control device 106. Node 110 of the power source 102 is electrically coupled to system neutral and to node 120 of the control device 106. Node 114 of the photocontrol apparatus 104 is electrically coupled to node 116 of the control device 106. The photocontrol apparatus 104 provides control signals to the control device 106 via the nodes 114 and 116. As will be explained below, the control device 106 uses the control signals provided by the photocontrol apparatus 104 to control the supply of electrical power to a load device (not shown).

If the photocontrol apparatus 104 is not illuminated with ambient light (e.g., during nighttime), the photocontrol apparatus 104 outputs a first control signal to the control device 106. When the first control signal is received by the control device 106, the control device 106 causes electrical power to be supplied to the load device. For example, the control device 106 causes electrical power to be supplied to an array of LEDs such that the array of LEDs produces a maximum rated amount of light. If the photocontrol apparatus 104 is illuminated with a sufficient amount of ambient light (e.g., during daytime), the photocontrol apparatus 104 outputs a second control signal to the control device 106. When the second control signal is received by the control device 106, the control device 106 reduces the amount of electrical power supplied to the load device. For example, the control device 106 reduces or stops the supply of electrical power to an array of LEDs such that the array of LEDs produces less light, or no light at all.

Figure 2A:
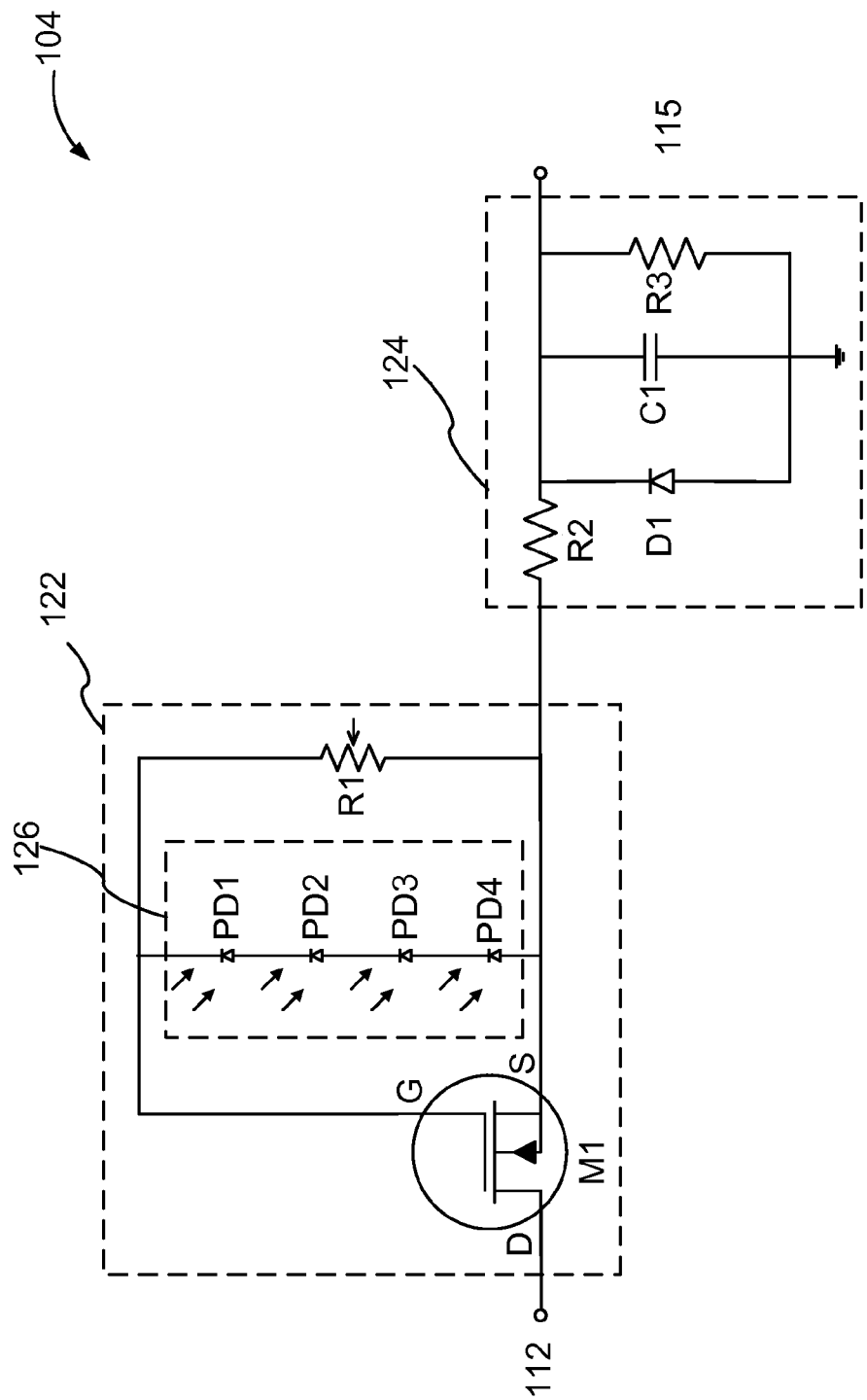
FIG. 2A is a detailed electrical schematic diagram of a photocontrol that can be used in the control system shown in FIG. 1, according to one illustrated embodiment.

FIG. 2A is a detailed electrical schematic diagram of the photocontrol apparatus 104 shown in FIG. 1, according to one illustrated embodiment. The photocontrol apparatus 104 includes a photocontrol circuit 122 and an output conditioner circuit 124. In one embodiment, the photocontrol apparatus 104 also includes an input conditioner circuit (not illustrated) coupled between node 112 and the photocontrol circuit 122 that provides overvoltage and/or current surge protection for the photocontrol apparatus 104.

The photocontrol circuit 124 includes a switch M1, a photosensor 126, and a resistive device R1. In the illustrated embodiment, the switch M1 is a low threshold, n-channel, depletion mode (normally-on) Metal Oxide Semiconductor Field Effect Transistor (MOSFET), such as transistor model DN2540 from Supertex Inc. In one embodiment, the switch M1 is a low threshold, p-channel, enhancement mode (normally-off) MOSFET. In one embodiment, the switch M1 is a low RDS(on), n-channel depletion mode MOSFET.

The switch M1 includes a drain node D, a gate node G, and a source node S. The drain node D is electrically coupled to the node 112, which can be electrically coupled to the node 108 of the power source 102 shown in FIG. 1. The photosensor 126 includes photodiodes PD1, PD2, PD3, and PD4 arranged electrically in series. The photosensor 126 is electrically coupled between the gate node G and the source node S of the switch M1. More particularly, the photodiodes PD1, PD2, PD3, and PD4 are arranged such that the cathode (i.e., more negative end) of photodiode PD1 is electrically coupled to the gate node G of the switch M1, and the anode (i.e., more positive end) of photodiode PD4 is electrically coupled to the source node S of the switch M1. When the photosensor 126 produces a sufficient amount of current, the voltage level of the gate node G with respect to the source node S of the switch M1 becomes more negative until the switch M1 turns OFF, as will be explained below.

The resistive device R1 is electrically coupled between the gate node G and the source node S of the switch M1 such that the resistive device R1 is electrically in parallel with the photosensor 126. The value of resistance of the resistive device R1 can control the turn-on/off set point of the photocontrol apparatus 104. That is, the voltage level of the gate node G with respect to the source node S can be controlled by the voltage drop across the resistive device R1, as will be explained below. In one embodiment, the value of resistance of the resistive device R1 is adjustable so that the turn-on/off set point of the photocontrol apparatus 104 can be adjusted. In one embodiment, the resistive device R1 is a manually adjustable potentiometer. In another embodiment, the resistive device R1 is an electronically adjustable potentiometer. In one embodiment, the photocontrol 206 does not include the resistive device R1 and the voltage level of the gate node G with respect to the source node S can be controlled by the voltage drop across the intrinsic parallel resistance of the photodiodes PD1, PD2, PD3, and PD4.

If the voltage level of the gate node G with respect to the source node S is greater than a threshold value (e.g., −1.5 volts), the resistance between the drain node D and the source node S becomes relatively small and a relatively high current can flow from the drain node D to the source node S of the switch M1 (i.e., the switch M1 turns ON). For example, if the voltage level of the gate node G with respect to a reference voltage level is 220 volts and the voltage level of the source node S with respect to the reference voltage level is 220 volts, the voltage level of the gate node G with respect to the source node S is 0 volts, which is greater than a threshold voltage level of −1.5 volts and thus the switch M1 is turned ON. If the voltage level of the gate node G with respect to the source node S is less than or equal to the threshold value, the resistance between the drain node D and the source node S becomes relatively high (i.e., the switch M1 turns OFF). For example, if the voltage level of the gate node G with respect to the reference voltage level is 218.4 volts and the voltage level of the source node S with respect to the reference voltage level is 220 volts, the voltage level of the gate node G with respect to the source node S is −1.6 volts, which is less than or equal to the threshold voltage level of −1.5 volts and thus the switch M1 is turned OFF.

When light strikes the photosensor 126, photons are absorbed by the photodiodes PD1, PD2, PD3 and PD4 and a current is produced that flows through the resistive device R1. When a sufficient amount of current flows through the resistive device R1, the voltage level of the gate node G with respect to the source node S becomes more negative until the switch M1 turns OFF. While the switch M1 is turned OFF, only a relatively small leakage current can flow through the resistive device R3 and the control signal provided to the control device 106 has a relatively low voltage level.

When no light strikes the photosensor 126, no current flows through the resistive device R1 and the voltage level of the gate node G with respect to the source node S becomes more positive until the switch M1 turns ON. While the switch M1 is turned ON, a relatively high current can flow through the resistive device R3 and the control signal provided to the control device 106 can have a relatively high voltage level.

The output conditioner circuit 124 includes a diode D1, a capacitor C1, and resistive devices R2 and R3. The output conditioner circuit 124 is coupled between the source node S of the switch M1 and the node 114 (i.e., output node of the photocontrol apparatus 104). In one embodiment, the capacitor C1 has a value of 4.7 microfarads, the resistive device R2 has a value of 1 Mohm, and the resistive device R3 has a value of 100 Kohms. The values of the components of the output conditioner circuit 124 may be selected such that the control signals output by the photocontrol apparatus 104 have voltage and current levels that are compatible with the control device 106. For example, the values of the components of the output conditioner circuit 124 may be selected such that the control signals output by the photocontrol apparatus 104 are compatible with an enable control input or a dimming control input of an LED driver incorporated within the AreaMax™ LED Area Light provided by the Evluma division of Express Imaging Systems, LLC.

Figure 2B:
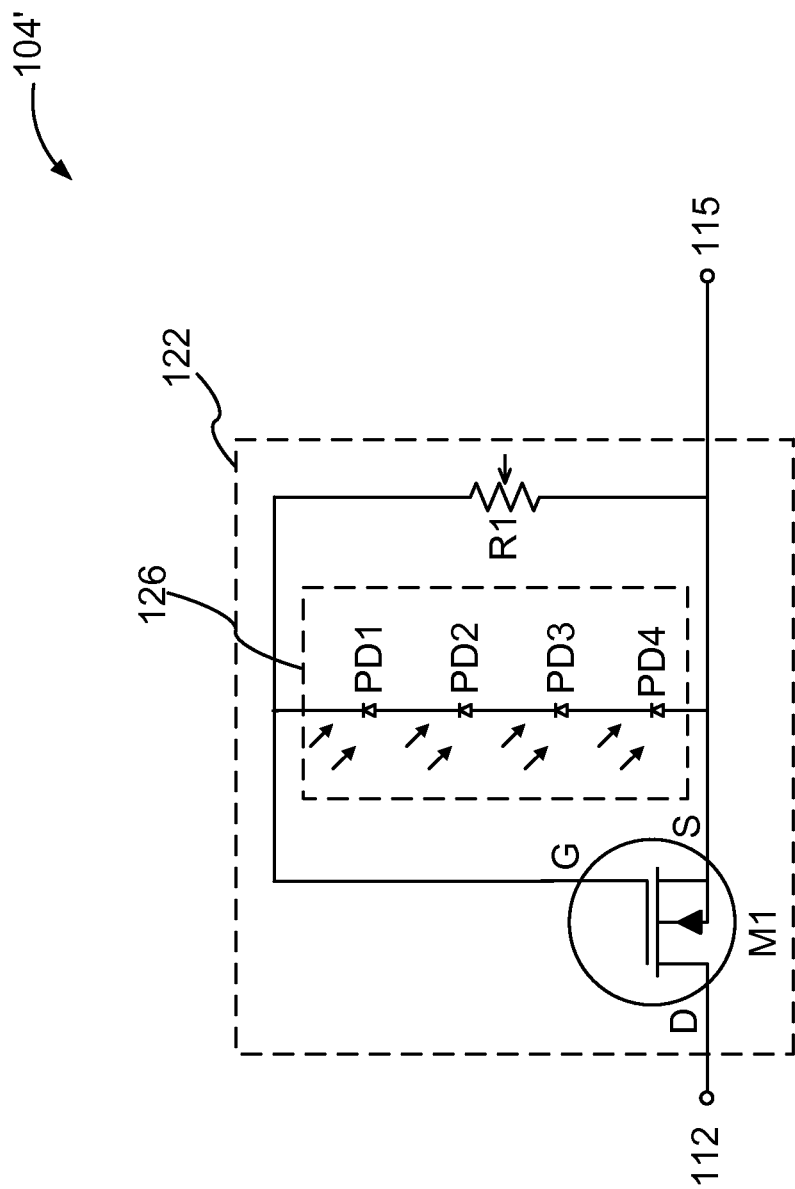
FIG. 2B is a detailed electrical schematic diagram of another photocontrol that can be used in the control system shown in FIG. 1, according to one illustrated embodiment.

FIG. 2B is a detailed electrical schematic diagram of a photocontrol apparatus 104' that can be used in place of the photocontrol apparatus 104 shown in FIG. 1, according to one illustrated embodiment. The photocontrol apparatus 104' includes the photocontrol circuit 122 described above in connection with FIG. 2A, but does not include the output conditioner circuit 124.

Figure 3:
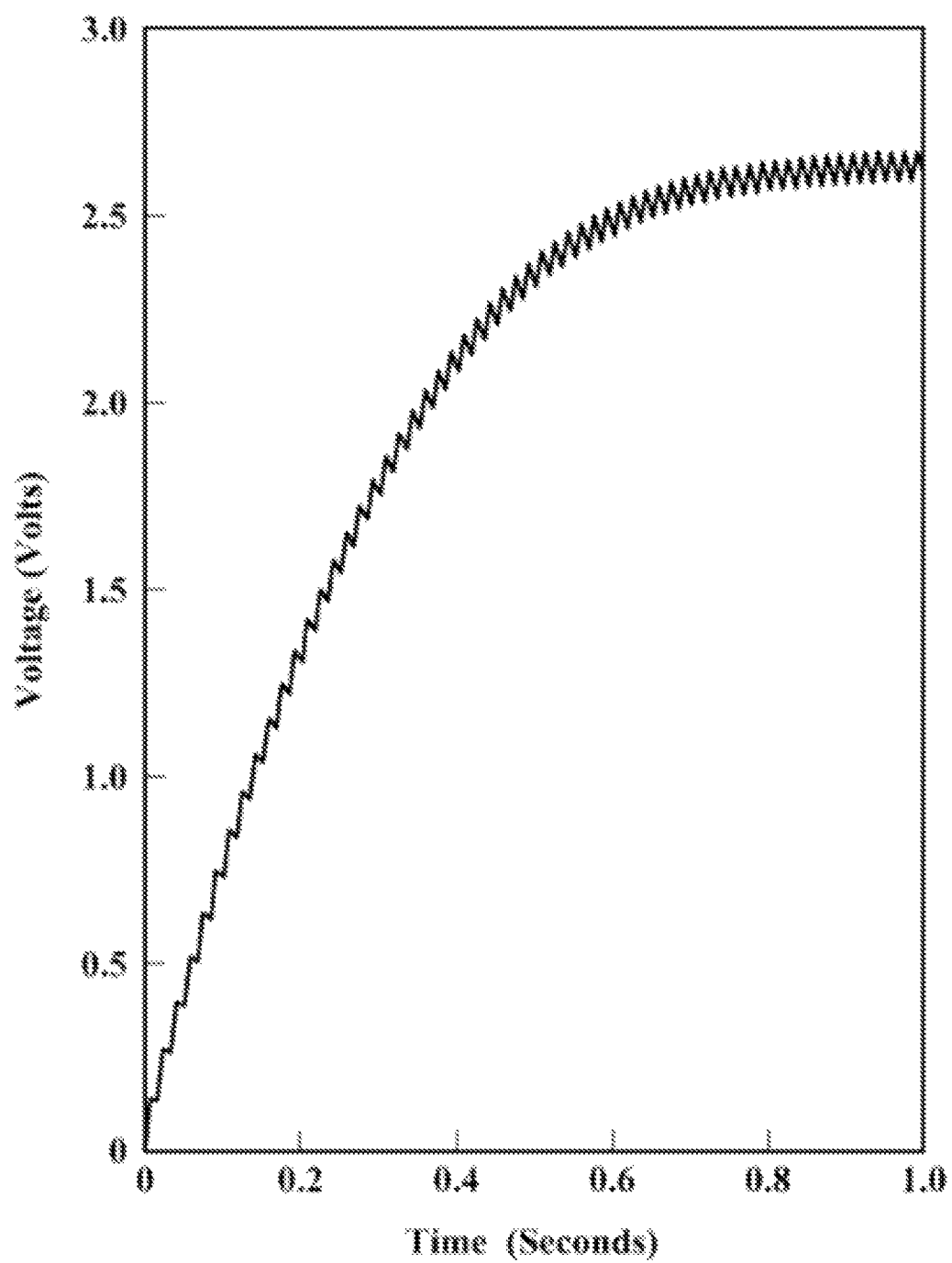
FIG. 3 is a hypothetical plot showing output voltage as a function of time when the photocontrol shown in FIG. 2A is used in a first environmental setting, according to one non-limiting illustrated embodiment.

FIG. 3 is a hypothetical plot showing the voltage level of a control signal output by the photocontrol apparatus 104 (i.e., the voltage across the resistive device R3 that is output by the node 114) as a function of time when the photocontrol apparatus 104 is used in a first environmental setting, according to one non-limiting illustrated embodiment. In the first environmental setting, the photosensor 126 is exposed to a relatively low level of ambient light that causes the photosensor 126 to generate 10 microamps of current, which is not sufficient to turn the switch M1 OFF (i.e., the switch M1 is ON). As shown in FIG. 3, the voltage level of the control signal is about 2.7 volts after about 1 second of exposure to the relatively low level of ambient light in the first environmental setting. The photocontrol apparatus 104 may provide a control signal having the voltage shown in FIG. 3 via the nodes 114 and 116 to the control device 106 to indicate that it is nighttime. By way of example, when the control device 106 receives the control signal shown in FIG. 3, the control device 106 controls power to an array of LEDs such that a maximum rated amount of light is output by the array of LEDs.

Figure 4:
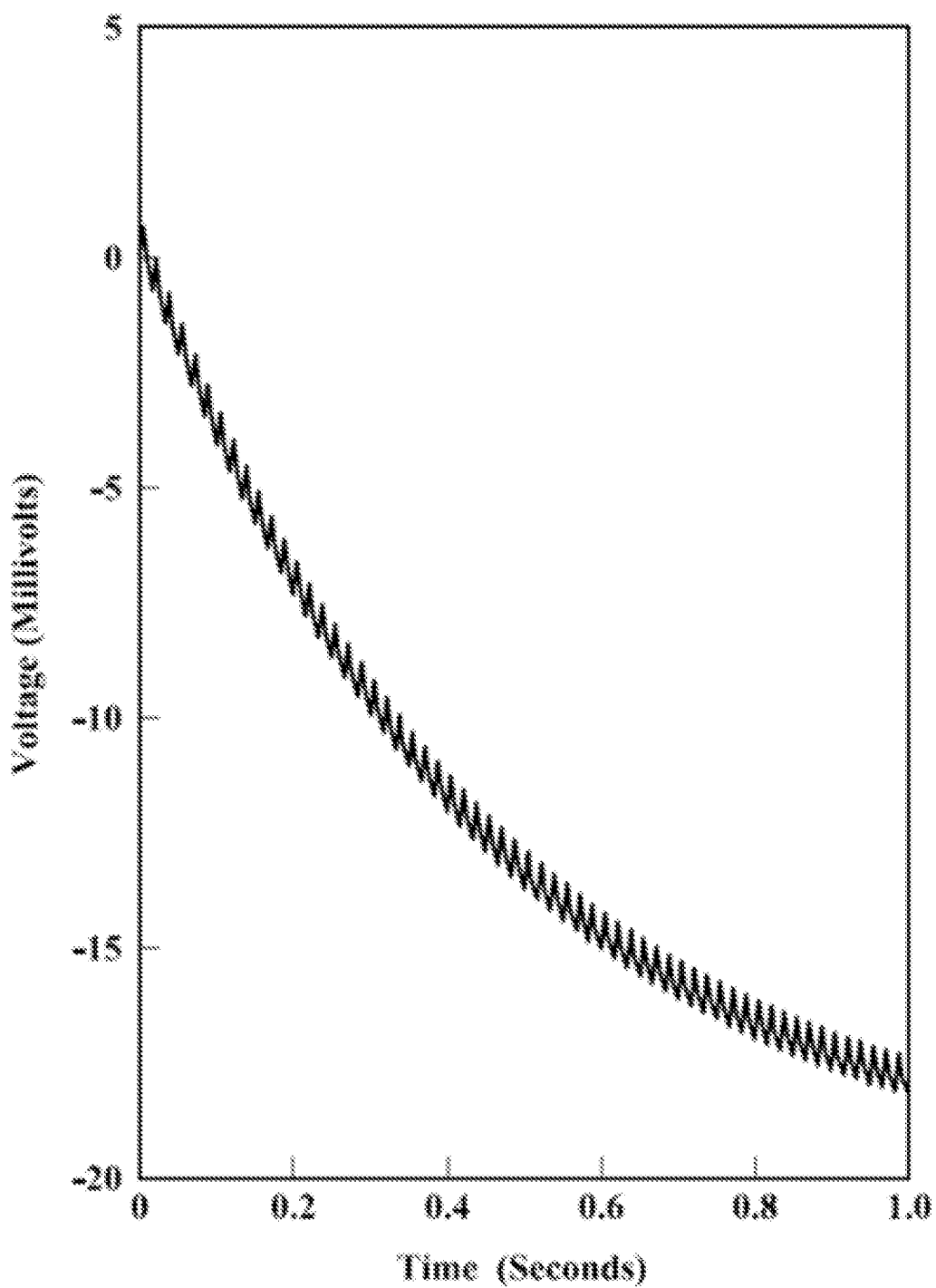
FIG. 4 is a hypothetical plot showing output voltage as a function of time when the photocontrol shown in FIG. 2A is used in a second environmental setting, according to one non-limiting illustrated embodiment.

FIG. 4 is a hypothetical plot showing the voltage level of a control signal output by the photocontrol apparatus 104 as a function of time when the photocontrol apparatus 104 is used in a second environmental setting, according to one non-limiting illustrated embodiment. In the second environmental setting, the photosensor 126 is exposed to a relatively high level of ambient light that causes the photosensor 126 to generate 100 microamps of current, which is sufficient to turn the switch M1 ON. As shown in FIG. 4, the voltage level of the control signal is about negative 18 millivolts after about 1 second of exposure to the relatively high level of ambient light in the second environmental setting. The photocontrol apparatus 104 may provide a control signal having the voltage shown in FIG. 4 via the nodes 114 and 116 to the control device 106 to indicate that it is daytime. By way of example, when the control device 106 receives the control signal shown in FIG. 4, it controls power to an array of LEDs such that a reduced amount of light (e.g., no light) is output by the array of LEDs.

Figure 5:
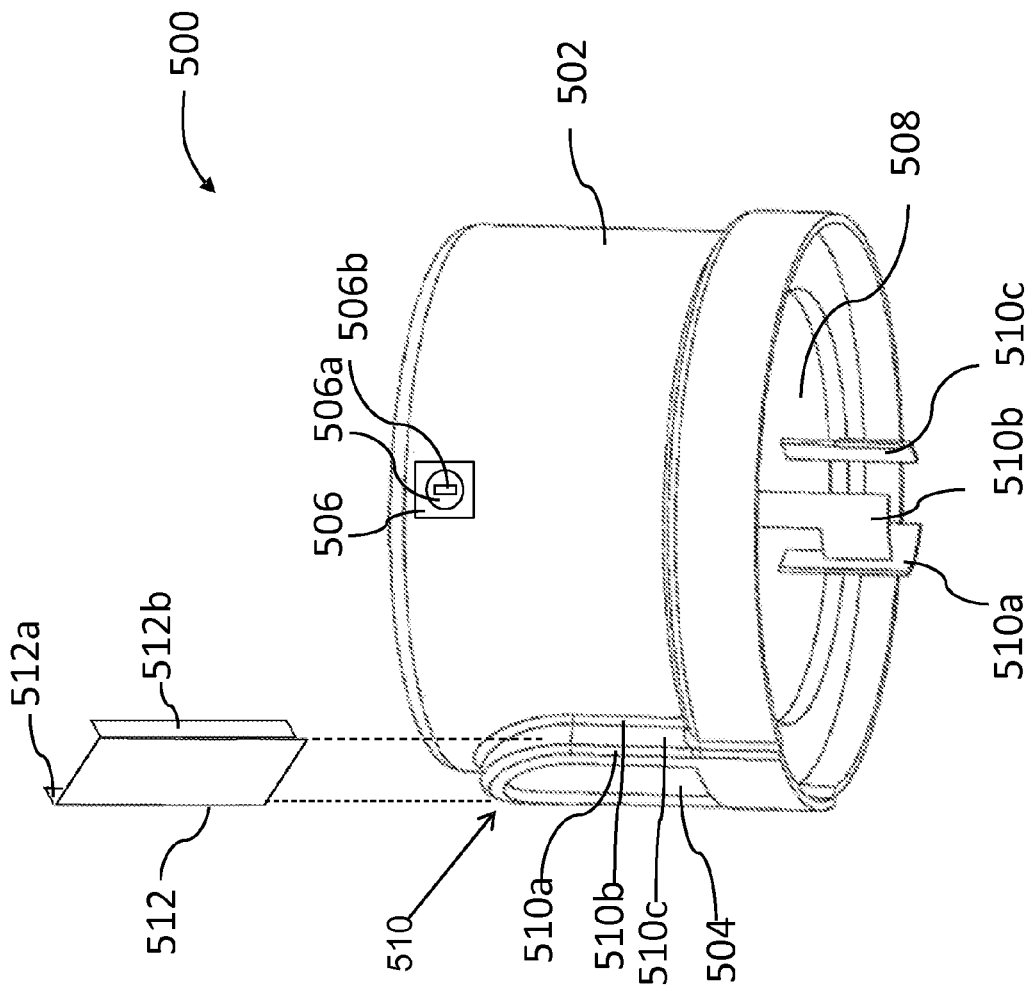
FIG. 5 is a perspective view of a photocontrol assembly, according to one illustrated embodiment.

FIG. 5 is a perspective view of a photocontrol assembly 500, according to one illustrated embodiment. The photocontrol assembly 500 includes a housing 502 having a translucent portion or window 504, a bottom portion 508, and contacts 510a, 510b, and 510c extending from the bottom portion 508. The photocontrol circuit 122 and the output conditioner circuit 124 may be mounted on a printed circuit board that is attached to the upper surface of the bottom portion 508 such that ambient light is able to pass through the window 504 and at least partially illuminate the photosensor 126.

In one embodiment, the nodes 112 and 114 of the photocontrol apparatus 104 are electrically coupled to the contacts 510a and 510b of the housing assembly 500, respectively. In one embodiment, the contacts 510a, 510b, and 510c are arranged to form a twist-locking type of connector defined by the National Electrical Manufacturers Association (NEMA).

In one illustrated embodiment, the resistive device R1 is a potentiometer and the housing assembly 500 includes an adjustment knob 506 having a rotatable portion 506a with a recess 506b formed therein. The potentiometer R1 is manually coupled to the rotatable portion 506a, for example, using a rigid piece of plastic that extends from the rotatable portion 506a to an adjustment knob of the potentiometer. When the tip of a screwdriver, for example, is inserted into the recess 506b and rotated, the value of resistance of the potentiometer changes. Accordingly, the adjustment knob 506 and the potentiometer enable the on/off set point of the photocontrol apparatus 104 to be adjusted when the photocontrol apparatus 104 is enclosed in the housing 502. In one embodiment, the resistive device R1 is an electronically controllable potentiometer, the resistance of which may be controlled remotely using wireless control signals (e.g., Bluetooth signals).

In one illustrated embodiment, the photocontrol assembly 500 includes a track 510 and an opaque portion or shutter 512. The track 510 is formed on the housing 502 around the window 504 and includes raised portions 510a and 510b disposed on opposite sides of a center portion 510c. The shutter 512 includes side portions 512a and 512b each having an inwardly facing projection (not shown) that fits snugly between the raised portions 510a and 510b of the track 510 on opposite sides of the window 504. The shutter 512 may be moved upwardly and downwardly along the track 510 to selectively permit and block ambient light from passing through the window 504 to the photosensor 126.

For example, if the photocontrol apparatus 104 is mounted inside the housing 500 and is deemed to provide the control signal indicating that it is daytime too early in the morning, the shutter 512 may be moved downwardly along the track 510 to block a portion of the window 504. When the shutter 512 blocks a portion of the window 504, a higher intensity of ambient light typically found later in the morning can be required to cause the photosensor 126 to produce sufficient current to turn the switch M1 OFF, which causes the photocontrol apparatus 104 to produce the control signal indicating that it is daytime later in the morning. Similarly, if the photocontrol apparatus 104 is deemed to provide the control signal indicating that it is daytime too late in the morning, the shutter 512 may be moved upwardly along the track 510 to block a smaller portion (or no portion) of the window 504. When the shutter 512 blocks less of the window 504, a lower intensity of ambient light typically found earlier in the morning can be sufficient to cause the photosensor 126 to produce enough current to turn the switch M1 OFF, which causes the photocontrol apparatus 104 to produce the control signal indicating that it is daytime earlier in the morning. Accordingly, the shutter 512 enables the on/off set point of the photocontrol apparatus 104 to be adjusted by selectively varying the degree to which the window 504 enables ambient light to pass to the photosensor 126.

In one embodiment, the shutter 512 is provided inside the housing 502, and the shutter 512 is coupled to an adjustment knob (not illustrated) provided on the outside of the housing 502 that enables the shutter 512 to be moved to selectively block and unblock at least part of the ambient light passing through the window 504. For example, the shutter 512 may be in the form of a louver blind with horizontal or vertical slats that can be moved using a knob or lever provided on the outside of the housing 502.

Figure 6:
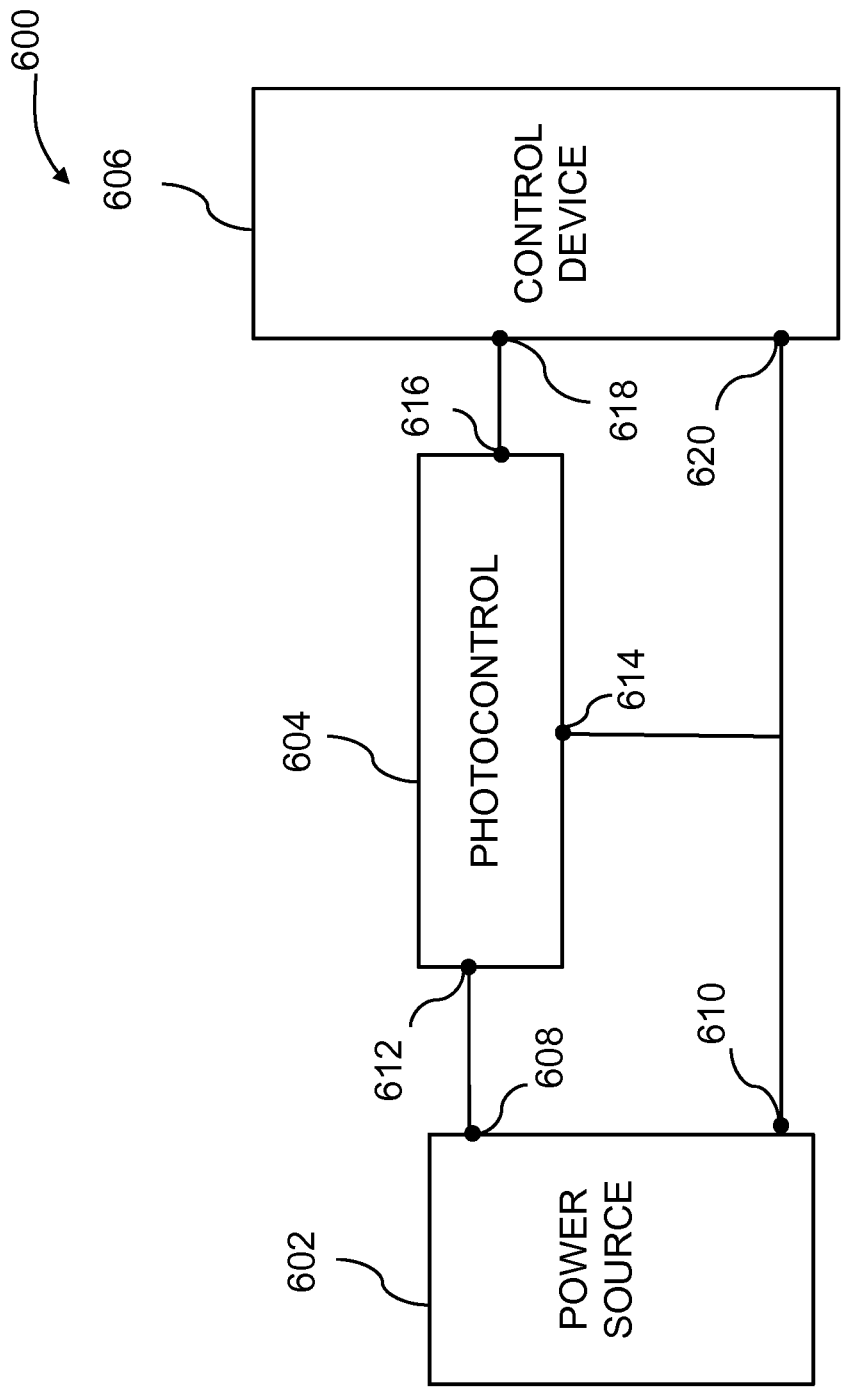
FIG. 6 is a block diagram of a control system, according to one illustrated embodiment.

FIG. 6 shows a control system 600, according to one illustrated embodiment. The description of FIG. 6 provides an overview of the structure and operation of the control system 600. A power source 602 (e.g., mains power) provides electrical power to a photocontrol apparatus 604. More particularly, the power source 602 provides line voltage from node 608 to node 612 of the photocontrol apparatus 604. Node 610 of the power source 602 is electrically coupled to system neutral and to node 614 of the photocontrol apparatus 604 and to node 620 of the control device 606. Node 616 of the photocontrol apparatus 604 is electrically coupled to node 618 of the control device 606. The photocontrol apparatus 604 selectively provides electrical power to the control device 606 via the nodes 616 and 618.

Figure 7:
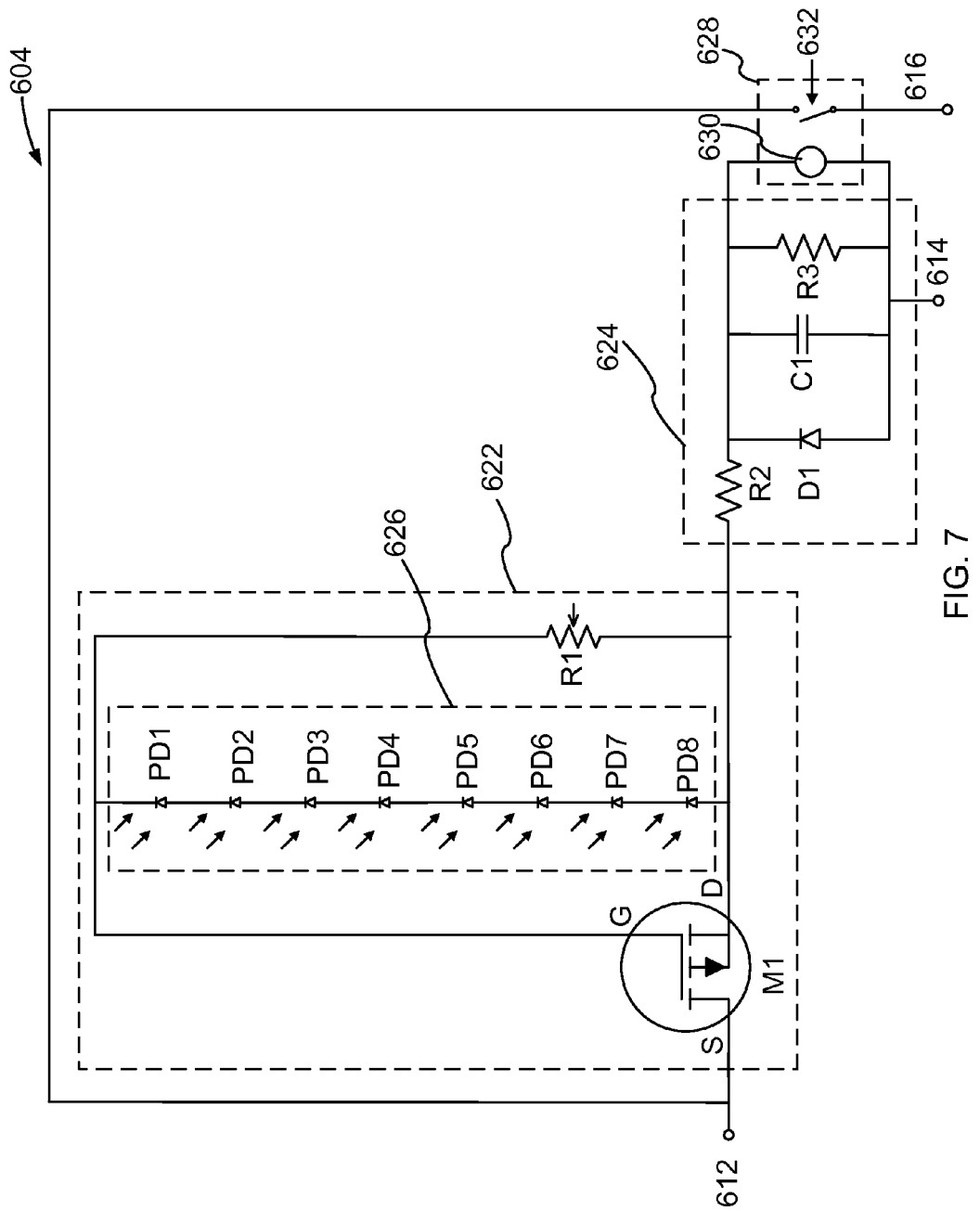
FIG. 7 is a detailed electrical schematic diagram of a photocontrol that can be used in the control system shown in FIG. 6, according to one illustrated embodiment.

FIG. 7 is a detailed electrical schematic diagram of the photocontrol apparatus 604 shown in FIG. 6, according to one illustrated embodiment. The photocontrol apparatus 604 includes a photocontrol circuit 622, an output conditioner circuit 624, and a relay device 628, which includes a relay coil 630 and a single pole, single throw switch 632. The photocontrol circuit 622 includes a switch M1, a photosensor 626, and a resistive device R1. The photosensor 626 includes photodiodes PD1, PD2, PD3, PD4, PD5, PD6, PD7, and PD8. In the illustrated embodiment, the switch M1 is a low threshold, p-channel, enhancement mode (normally-off) MOSFET. For example, the switch M1 is a model TP2640 transistor from Supertex, Inc. In one embodiment, the switch M1 is a low threshold, n-channel, depletion mode (normally-on) MOSFET. In one embodiment, the switch M1 is a low RDS(on), n-channel depletion mode MOSFET.

The output conditioner circuit 624 includes a diode D1, a capacitor C1, and resistive devices R2 and R3. The output conditioner circuit 624 is coupled between the source node S of the switch M1 and the relay coil 630 of the relay device 628. The values of the components of the output conditioner circuit 624 may be selected such that the control signals output by the output conditioner circuit 624 have voltage and current levels that are compatible with the relay coil 630.

The resistive device R3 of the output conditioner circuit 624 is electrically coupled to the relay coil 630. By default, the switch 632 is closed (i.e., the switch 632 is in an electrically continuous state). When the switch M1 outputs a control signal indicating that it is nighttime, the switch 632 remains closed. When the switch M1 outputs a control signal indicating that it is daytime, the relay coil 630 causes the switch 632 to open (i.e., the switch 632 transitions to an electrically discontinuous state). The switch 632 remains open until the switch M1 outputs the control signal indicating that it is nighttime to the relay coil 630, which causes the switch 632 to close.

More particularly, when light strikes the photosensor 626, photons are absorbed by the photodiodes PD1, PD2, PD3, PD4, PD5, PD6, PD7, and PD8 and a current is produced that flows through the resistive device R1. When a sufficient amount of current flows through the resistive device R1, the voltage level of the gate node G with respect to the drain node D becomes more negative until it is greater than or equal to a threshold voltage level (e.g., −5 volts) and the switch M1 turns ON. For example, if the voltage level of the gate node G with respect to a reference voltage level is −5.5 volts and the voltage level of the drain node D with respect to the reference voltage level is 0 volts, the voltage level of the gate node G with respect to the drain node D is −5.5 volts, which is less than or equal to a threshold voltage level of −5 volts and the switch M1 turns ON. While the switch M1 is turned ON, a relatively high current can flow through the relay coil 630, which causes the switch 632 to turn OFF. While the switch 632 is turned OFF, an electrical power signal from the power source 602 is not able to flow to the control device 606.

When relatively little light strikes the photosensor 626, a relatively small current flows through the resistive device R1 and the voltage level of the gate node G becomes closer to the drain node D until the switch M1 turns OFF. For example, if the voltage level of the gate node G with respect to the reference voltage level is 216 volts and the voltage level of the drain node D with respect to the reference voltage is 220 volts, the voltage level of the gate node G with respect to the drain node D is −4 volts, which is greater than the threshold voltage level of −5 volts and the switch M1 turns OFF. While the switch M1 is turned OFF, only a relatively small leakage current can flow through the relay coil 630, which causes the switch 632 to turn ON. While the switch 632 is turned ON, the electrical power signal from the power source 602 is able to flow to the control device 606.

Figure 8:
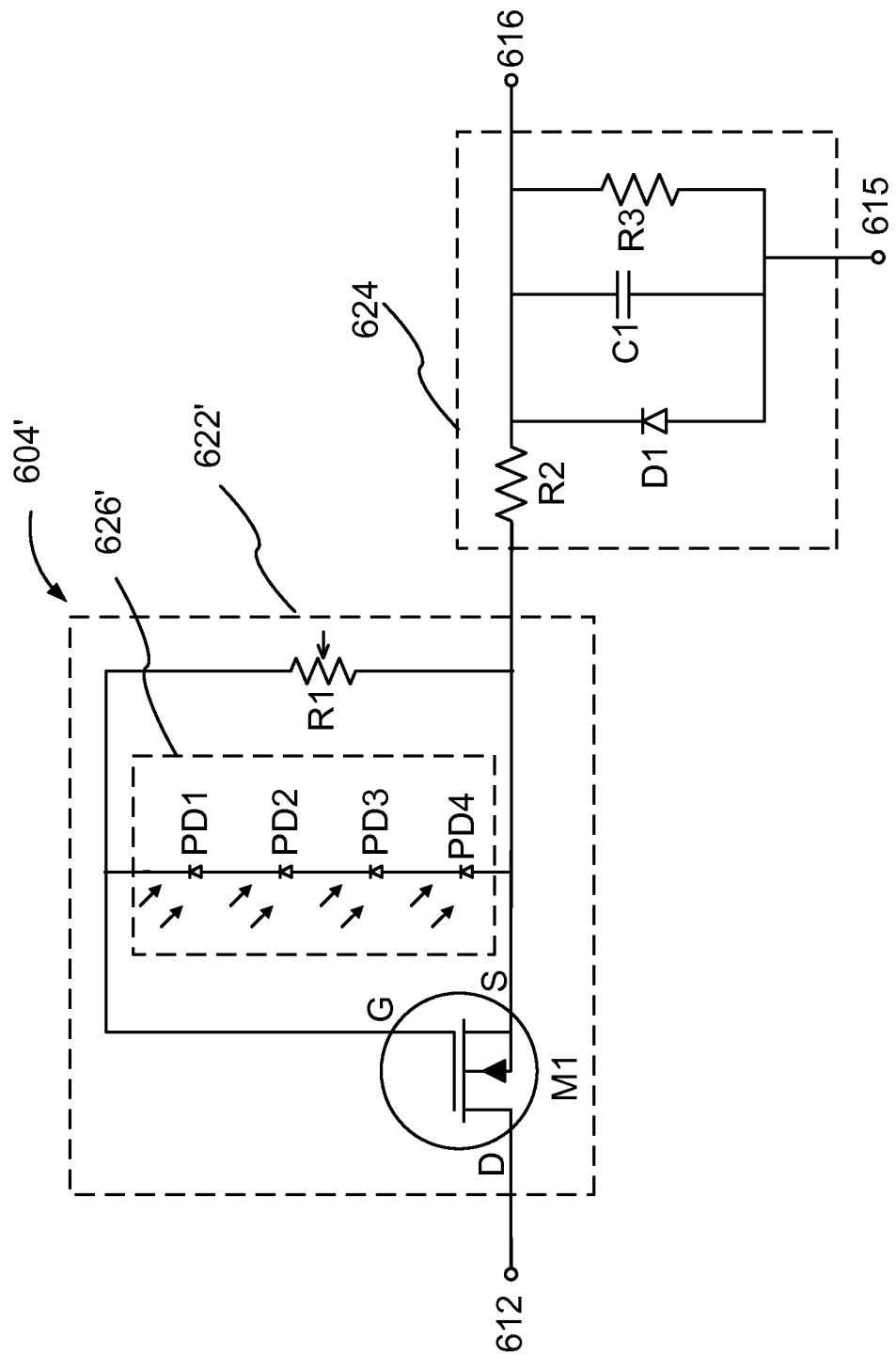
FIG. 8 is a detailed electrical schematic diagram of another photocontrol that can be used in the control system shown in FIG. 6, according to one illustrated embodiment.

FIG. 8 is a detailed electrical schematic diagram of a photocontrol apparatus 604', according to one illustrated embodiment. The photocontrol apparatus 604' can be used in place of the photocontrol apparatus 604 shown in FIG. 6. The photocontrol apparatus 604' includes a photocontrol circuit 902 and the output conditioner circuit 624. The photocontrol circuit 902 includes a switch M1, a photosensor 626', and a resistive device R1. In the illustrated embodiment, the switch M1 is a low RDS(on), n-channel depletion mode MOSFET. For example, the switch M1 is a transistor model IXTP6N100D2 from IXYS Corp. Preferably the resistance from the drain node D to the source node S when the switch M1 is turned ON is between 2 and 5 ohms, and more preferably between 100 and 500 milliohms. In one embodiment, the switch M1 is a low threshold, p-channel, enhancement mode (normally-off) MOSFET. In one embodiment, the switch M1 is a low threshold, n-channel, depletion mode (normally-on) MOSFET.

If no light strikes the photosensor 626', the switch M1 is turned ON. While the switch M1 is turned ON, a power signal from the power source 602 is able to flow from the node 608 to the node 612 and through the switch M1 to the control device 606. More particularly, the power signal from the power source 602 flows through the drain node D to the source node S of the switch M1, through the output conditioner circuit 624, and then to the node 616, which is electrically coupled to the node 618 of the control device 606. When light strikes the photosensor 626', current flows through the resistive device R1 and the voltage level of the gate node G with respect to the source node S becomes more negative until the switch M1 turns OFF. If the switch M1 is turned OFF, the power signal from the power source 602 is not able to flow through the switch M1 to the control device 606.

Figure 9:
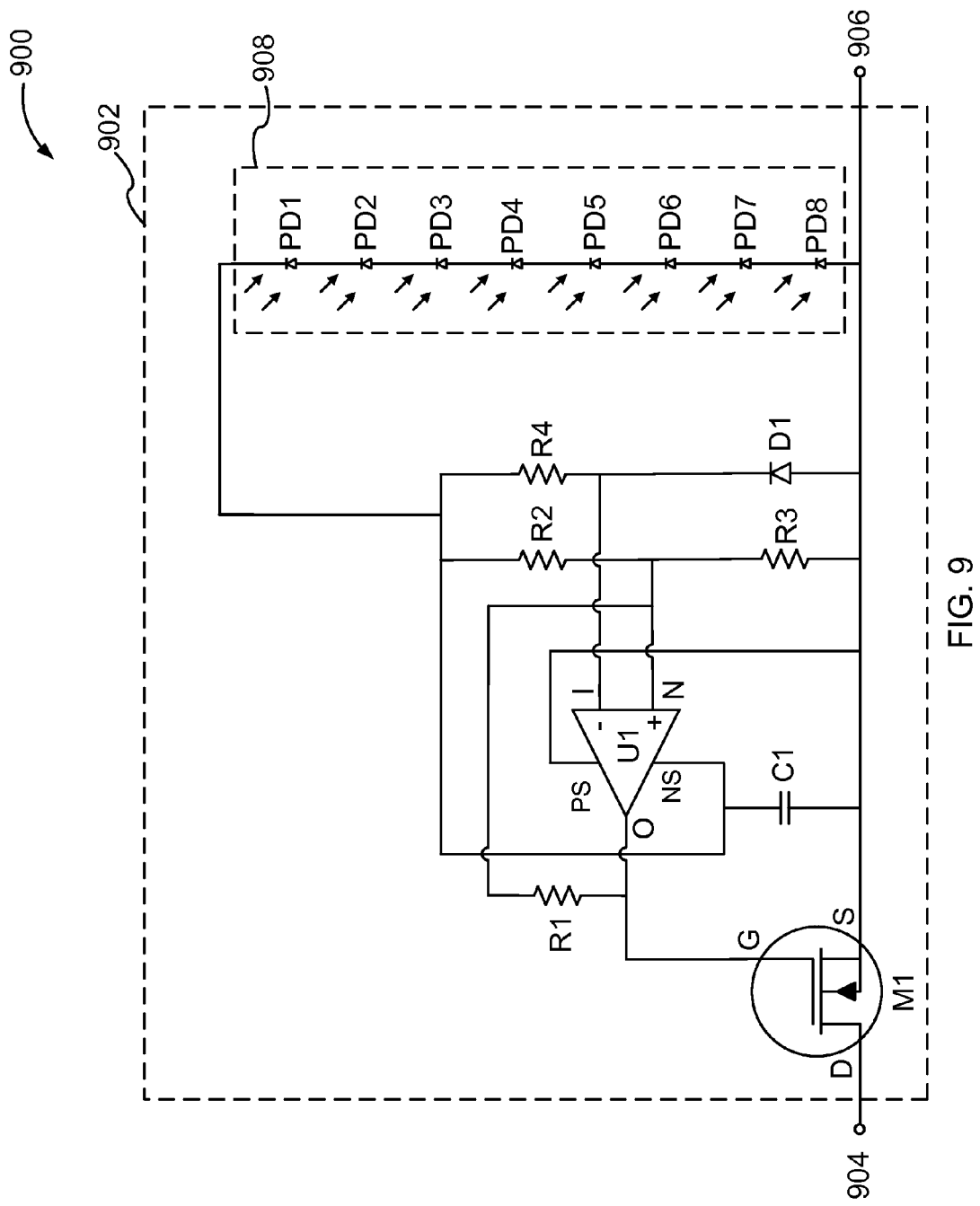
FIG. 9 is a detailed electrical schematic diagram of a photocontrol, according to one illustrated embodiment.

FIG. 9 is a detailed electrical schematic diagram of a photocontrol apparatus 900, according to one illustrated embodiment. The photocontrol apparatus 900 includes a photocontrol circuit 902, an input node 904, and an output node 906. The photocontrol apparatus 900 can be used in place of the photocontrol apparatus 104 shown in FIG. 1. That is, the input node 904 of the photocontrol apparatus 900 can be electrically coupled to the node 108 of the power source 102 and the output node 906 of the photocontrol apparatus 900 can be electrically coupled to the node 118 of the control device 106.

The photocontrol circuit 902 includes a switch M1, a photosensor 908, a comparator U1, a capacitor C1, a diode D1, and resistive devices R1, R2, R3, and R4. In one embodiment, the value of the resistive device R1 is 20 megaohms, the value of the resistive device R2 is 20 megaohms, the value of the resistive device R3 is 2 megaohms, the value of the resistive device R4 is 20 megaohms, and the value of the capacitor C1 is 10 microfarads. The switch M1 includes a drain node D, a gate node G, and a source node S. In one embodiment, the switch M1 is a low threshold, n-channel, depletion mode (normally-on) Metal Oxide Semiconductor Field Effect Transistor (MOSFET), such as transistor model DN2540 from Supertex Inc. The photosensor 908 includes photodiodes PD1, PD2, PD3, PD4, PD5, PD6, PD7, and PD8.

The comparator U1 includes a positive supply voltage node PS, a negative supply voltage node NS, an inverting input node I, a non-inverting input node N, and an output node O. In one embodiment, the comparator U1 is a model LT6003, 1.6V, 1 µA precision rail-to-rail input and output operational amplifier from Linear Technology Corporation.

The capacitor C1 is electrically coupled between the negative supply voltage node NS of the comparator U1 and the source node S of the switch M1. The source node S of the switch M1 is electrically coupled to the positive supply voltage node PS of the comparator U1. The output node O of the comparator U1 is electrically coupled to the gate node G of the switch M1. The resistive device R1 is electrically coupled between the output node O of the comparator U1 and the non-inverting input node N of the comparator U1. The resistive device R2 is electrically coupled between the non-inverting input node N of the comparator U1 and the cathode of the photosensor 908. The resistive device R3 is electrically coupled between the non-inverting input node N of the comparator U1 and the source node S of the switch M1. The resistive device R4 is electrically coupled between the inverting input node I of the comparator U1 and the cathode of the photosensor 908. The cathode of the diode D1 is electrically coupled to the inverting input node I of the comparator U1, and the anode of the diode D1 is electrically coupled to the source node S of the switch M1. The cathode of the photosensor 908 is electrically coupled to the negative supply voltage node NS of the comparator U1, and the anode of the photosensor 908 is electrically coupled to the source node S of the switch M1.

Figure 14:
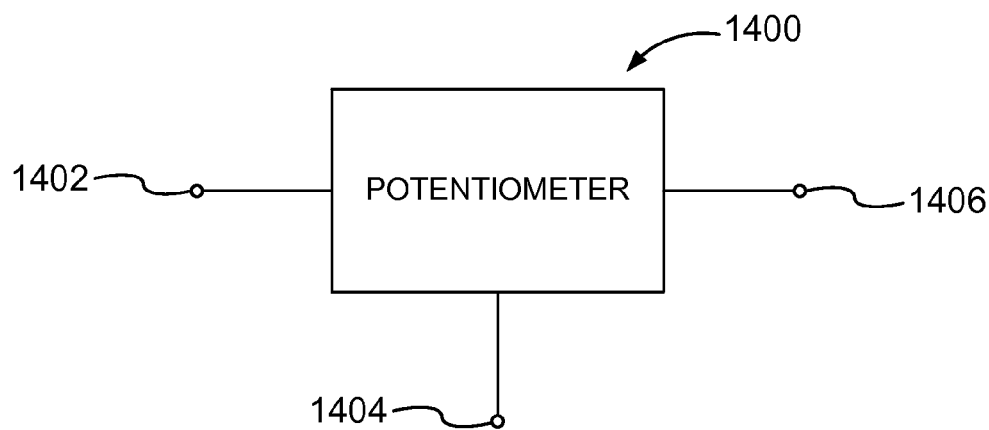
FIG. 14 is a block diagram of a potentiometer, according to one illustrated embodiment.

The resistive device R1 provides positive feedback to the comparator U1, and causes the photocontrol circuit 902 to have switching hysteresis. The resistive devices R2 and R3 form a voltage divider that controls the voltage level V+ at the non-inverting input node N of the comparator U1. In one embodiment, the resistive devices R2 and R3 are included in a trimming potentiometer. FIG. 14 is a block diagram of a potentiometer 1400 according to one embodiment. The potentiometer 1400 includes a first node 1402, a second node 1404, and a third node 1406. In one embodiment, the first node 1402 is electrically coupled to the cathode of the photosensor 908, the second node 1404 is electrically coupled to the non-inverting input node N of the comparator U1, and the third node 1406 is electrically coupled to the source node S of the switch M1.

The forward voltage of the diode D1 provides a reference voltage at the inverting input node I of the comparator U1. In one embodiment, the diode D1 is a model MMSD4148 diode from Fairchild Semiconductor. The diode D1 may have a temperature coefficient similar to that of the photosensor 908, or a temperature coefficient that is higher or lower than that of the photosensor 908. In one embodiment, the diode D1 is a red light emitting diode (LED). In another embodiment, an integrated circuit reference voltage is used on place of the diode D1.

When the switch M1 is ON and the photosensor 908 is not producing current, the output of the comparator U1 is the same as the voltage level of the source node S. As a result, the voltage level of the gate node G of the switch M1 is the same as the voltage level of the source node S of the switch M1 and the switch M1 remains ON. If the photosensor 908 produces enough current to cause the voltage level V+ at the non-inverting input node N of the comparator U1 to fall below the voltage level V− at the inverting input node N of the comparator U1, the comparator U1 outputs the voltage level provided to the negative power supply node NS of the comparator U1. As result, the voltage level of the gate node G of the switch M1 drops sufficiently below the voltage level of the source node S of the switch M1 to cause the switch M1 to turn OFF.

When the switch M1 is OFF and the photosensor 908 stops producing enough current to cause the voltage level V+ at the non-inverting input node N of the comparator U1 to be below the voltage level V− at the inverting input node N of the comparator U1, the comparator U1 outputs the voltage level provided to the positive power supply node PS of the comparator U1. As result, the voltage level of the gate node G of the switch M1 is no longer sufficiently below the voltage level of the source node S of the switch M1 to keep the switch M1 turned OFF and the switch turns ON. Similarly, when the switch M1 is OFF and the photosensor 908 stops producing enough current to keep the voltage level at the negative and/or the positive power supply nodes NS and NP above a minimum operating voltage level to keep the comparator U1 operational, the voltage level of the gate node G of the switch M1 not sufficiently below the voltage level of the source node S of the switch M1 to keep the switch M1 turned OFF and the switch turns ON.

Figure 10:
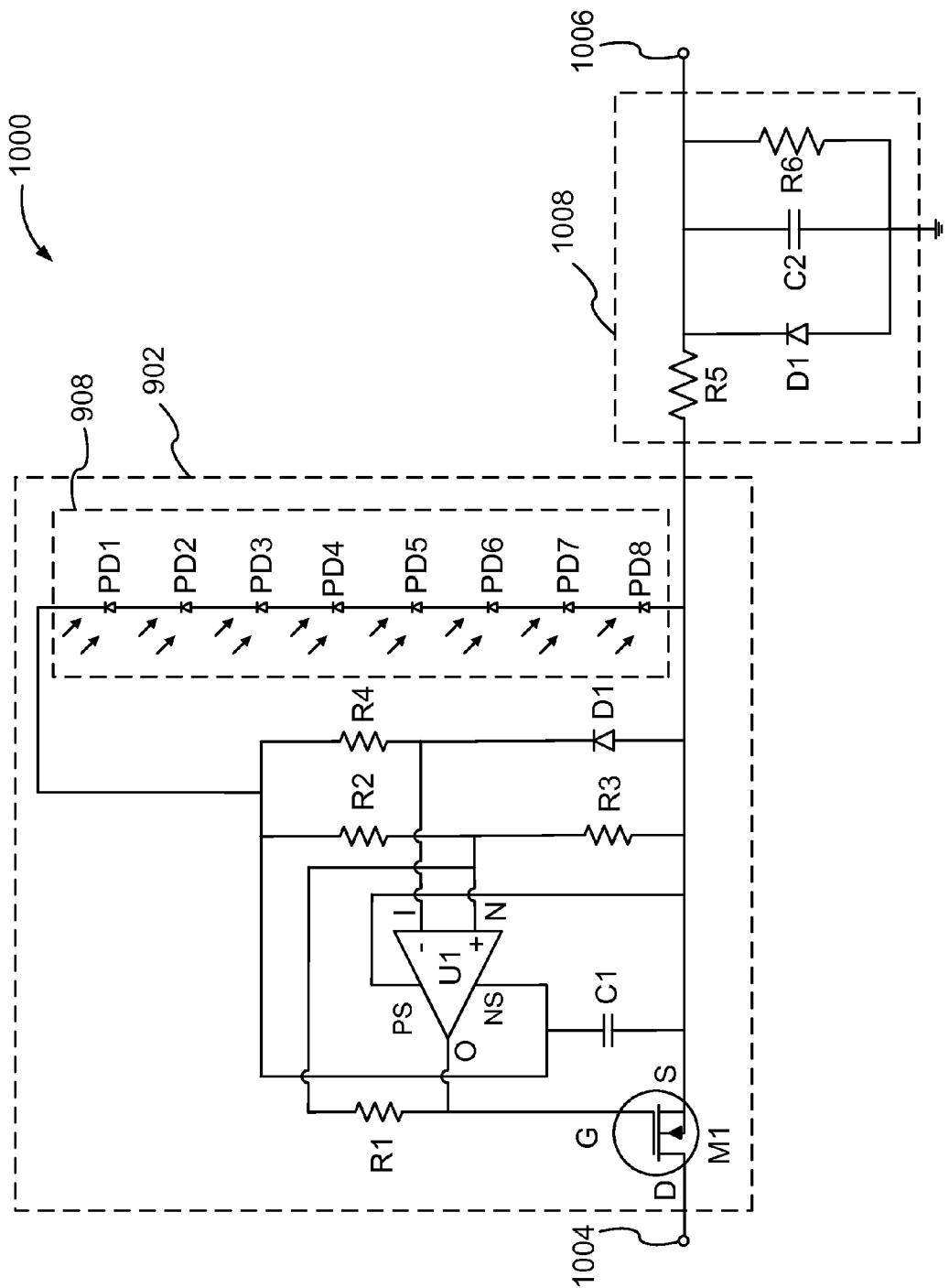
FIG. 10 is a detailed electrical schematic diagram of a photocontrol, according to one illustrated embodiment.

FIG. 10 is a detailed electrical schematic diagram of a photocontrol apparatus 1000 according to one illustrated embodiment. The photocontrol apparatus 1000 includes the photocontrol circuit 902 described above in connection with FIG. 9, an input node 1004, an output node 1006, and an output conditioner circuit 1008. In one embodiment, the output conditioner circuit 1008 is the same as the output conditioner circuit 124 described above in connection with FIG. 2A. The photocontrol apparatus 1000 can be used in place of the photocontrol apparatus 104 shown in FIG. 1. That is, the input node 1004 of the photocontrol apparatus 1000 can be electrically coupled to the node 108 of the power source 102 and the output node 1006 of the photocontrol apparatus 1000 can be electrically coupled to the node 118 of the control device 106.

Figure 11:
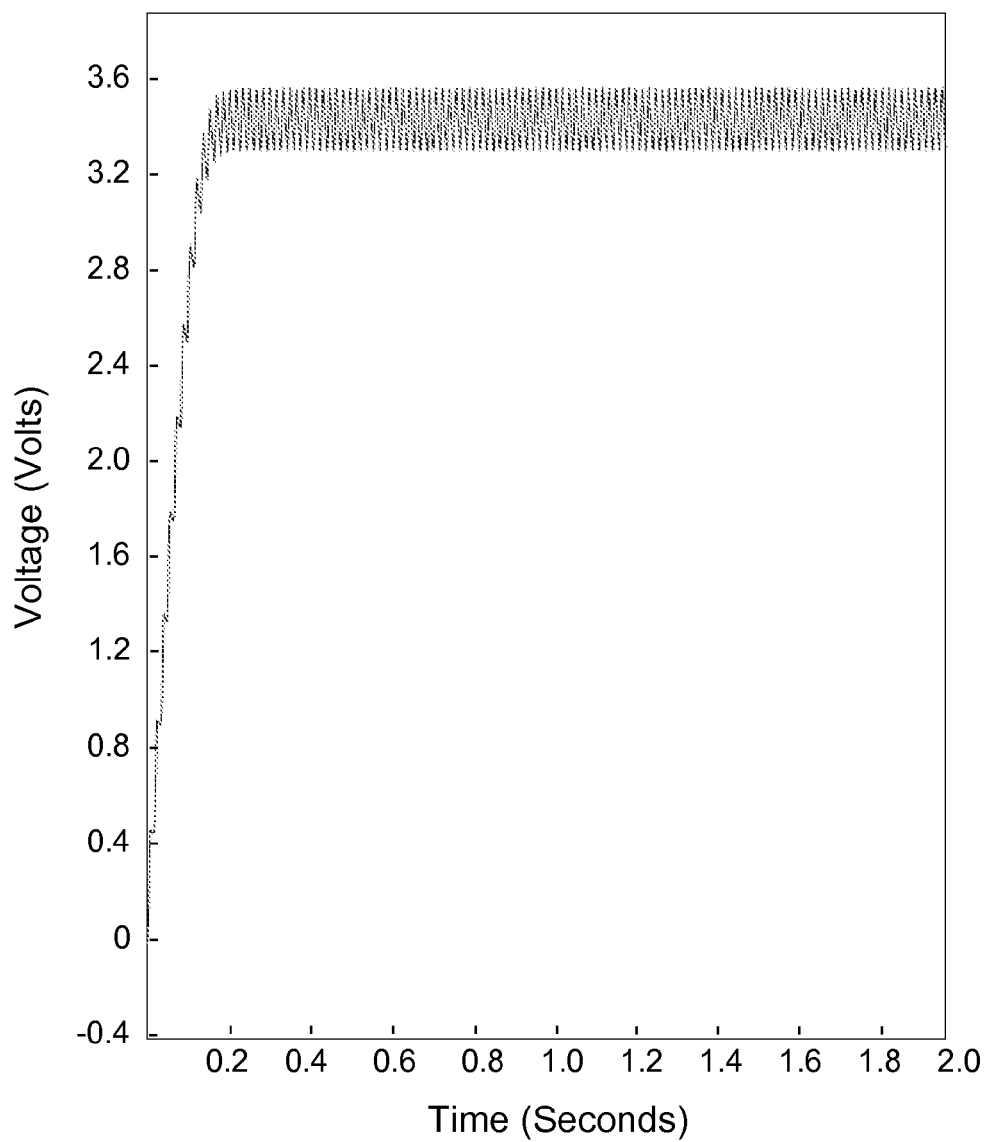
FIG. 11 is a hypothetical plot showing output voltage as a function of time when the photocontrol shown in FIG. 10 is used in a third environmental setting, according to one non-limiting illustrated embodiment.

FIG. 11 is a hypothetical plot showing the voltage level of a control signal output by the photocontrol apparatus 1000 as a function of time when the photocontrol apparatus 1000 is used in place of the photocontrol apparatus 104 shown in FIG. 1. The photocontrol apparatus 1000 is operated in a third environmental setting in which the photosensor 908 is exposed to a level of ambient light that causes the photosensor 908 to generate a current having a magnitude that is not sufficient to cause the switch M1 to turn OFF (i.e., the switch M1 is ON). As shown in FIG. 11, the voltage level of the control signal is about 3.5 volts after about 0.2 seconds of exposure to the relatively low level of ambient light in the third environmental setting. The photocontrol apparatus 1000 may provide the control signal shown in FIG. 11 via the nodes 1006 and 116 to the control device 106 to indicate that it is nighttime. For example, when the control device 106 receives the control signal shown in FIG. 11, the control device 106 controls power to an array of LEDs such that a maximum rated amount of light is output by the array of LEDs.

Figure 12:
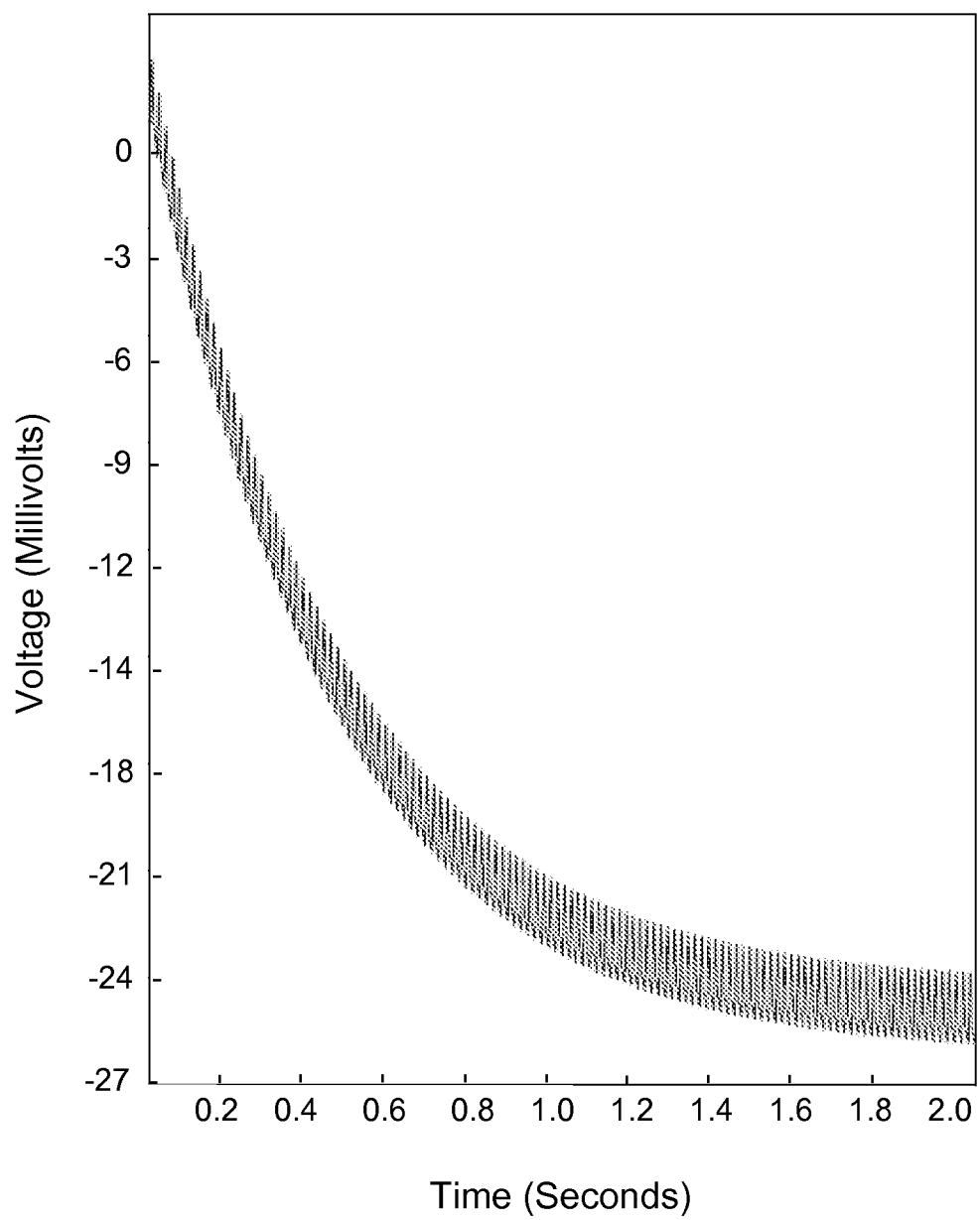
FIG. 12 is a hypothetical plot showing output voltage as a function of time when the photocontrol shown in FIG. 10 is used in a fourth environmental setting, according to one non-limiting illustrated embodiment.

FIG. 12 is a hypothetical plot showing the voltage level of a control signal output by the photocontrol apparatus 1000 as a function of time when the photocontrol apparatus 1000 is used in place of the photocontrol apparatus 104 shown in FIG. 1. The photocontrol apparatus 1000 is operated in a fourth environmental setting, in which the photosensor 908 is exposed to a level of ambient light that causes the photosensor 908 to generate a current of sufficient magnitude to cause the switch M1 to turn OFF. As shown in FIG. 12, the voltage level of the control signal is about negative 25 millivolts after about 1.8 seconds of exposure to the relatively high level of ambient light in the fourth environmental setting. The photocontrol apparatus 1000 may provide the control signal shown in FIG. 12 via the nodes 1006 and 116 to the control device 106 to indicate that it is daytime. For example, when the control device 106 receives the control signal shown in FIG. 12, it controls power to an array of LEDs such that a reduced amount of light (e.g., no light) is output by the array of LEDs.

As will be explained below, the photocontrol circuit 902 of the photocontrol apparatus 1000 can prevent the photocontrol apparatus 1000 from outputting a signal that causes the control device 106 to turn OFF the load device during nighttime when the photosensor 908 of the photocontrol apparatus 1000 is illuminated with a relatively low level of light. For example, the photocontrol circuit 902 of the photocontrol apparatus 1000 can prevent stray light emitted by a light source controlled by the control device 106 from causing the photocontrol apparatus 1000 to output a control signal that causes the control device 106 to turn the light source OFF.

Figure 13A:
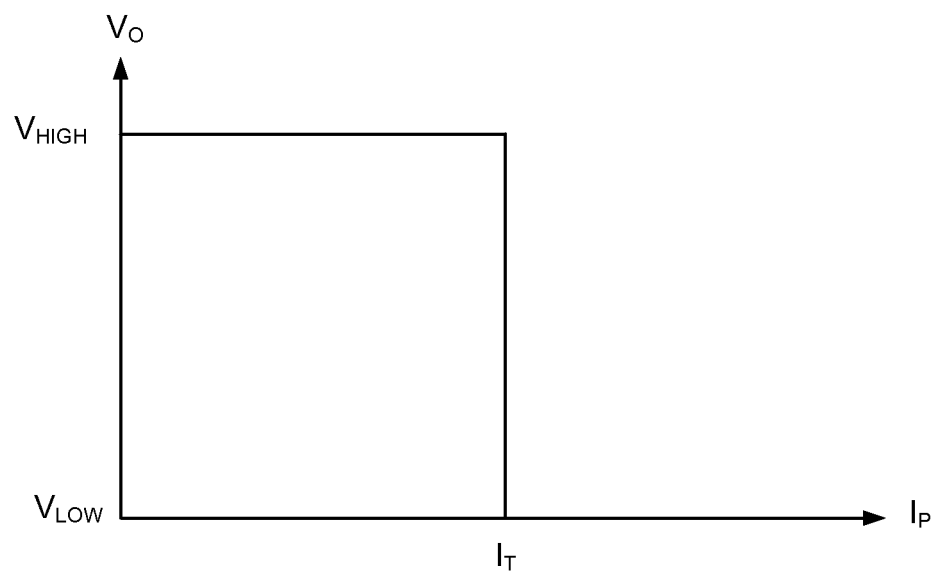
FIG. 13A is a hypothetical graph showing output voltage of the photocontrol shown in FIG. 2A as a function of photosensor current, according to one non-limiting illustrated embodiment.
Figure 13B:
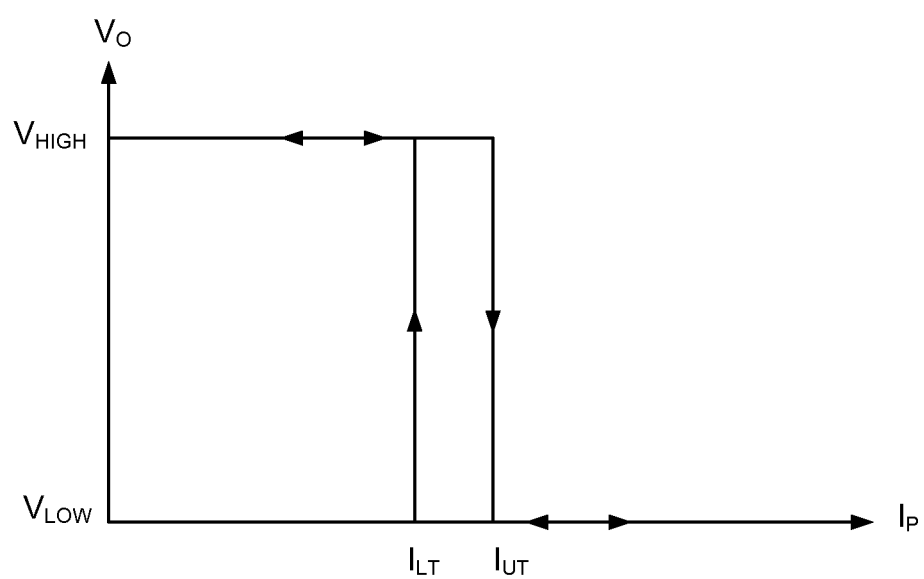
FIG. 13B is a hypothetical graph showing output voltage of the photocontrol shown in FIG. 10 as a function of photosensor current, according to one non-limiting illustrated embodiment.

The operation of the photocontrol apparatus 1000 will now be compared to the operation of the photocontrol apparatus 104 with reference to FIGS. 13A and 13B. FIG. 13A is a hypothetical graph showing a voltage $V_O$ output by the photocontrol apparatus 104 shown in FIG. 2A as a function of a current $I_P$ generated by the photosensor 126. The switching point of the photocontrol circuit 122 is determined by a threshold current level $I_T$ that causes the switch M1 to turn ON and OFF. When the magnitude of the current $I_P$ generated by the photosensor 126 is less than the threshold current level $I_T$, the switch M1 is ON and the magnitude of the output voltage $V_O$ of the photocontrol apparatus 104 is $V_{HIGH}$. When the magnitude of the current Ip generated by the photosensor 126 is greater than the threshold current level $I_T$, the switch M1 turns OFF and the magnitude of the output voltage $V_O$ of the photocontrol apparatus 104 is $V_{LOW}$.

When the magnitude of the current $I_P$ generated by the photosensor 126 is near the threshold current level $I_T$, relatively small fluctuations in the intensity of light that illuminates the photosensor 126 may cause the magnitude of the current $I_P$ generated by the photosensor 126 to fluctuate above and below the threshold current level $I_T$. When the magnitude of the current $I_P$ generated by the photosensor 126 rapidly fluctuates above and below the threshold current level $I_T$, the level of the output voltage $V_O$ of the photocontrol apparatus 104 rapidly between $V_{Low}$ and $V_{HIGH}$. If the photocontrol apparatus 104 provides such an output voltage $V_O$ as input to the control device 106 shown in FIG. 1, the control device 106 would rapidly switch a load device (e.g., a light source) ON and OFF. For example, when the output voltage $V_O$ of the photocontrol apparatus 104 is provided as input to a controller that controls a light source, relatively small changes in the intensity of light that illuminates the photosensor 126 that occur frequently may cause the light source to rapidly turn ON and OFF.

FIG. 13B is a hypothetical graph showing a voltage $V_O$ output by the photocontrol apparatus 1000 shown in FIG. 10 as a function of a current $I_P$ generated by the photosensor 908. The switching points of the photocontrol circuit 902 are determined by a lower threshold current level $I_{LT}$ and an upper threshold current level $I_{UT}$ that cause the switch M1 to turn ON and OFF, depending on the state of the photocontrol circuit 902 (e.g., the state of the comparator U1 or the switch M1). When the switch M1 is ON and the magnitude of the current $I_P$ generated by the photosensor 908 rises above the upper threshold current level $I_{UT}$, the switch M1 turns OFF and the magnitude of the output voltage $V_O$ of the photocontrol apparatus 1000 becomes $V_{LOW}$. When the switch M1 is OFF and the magnitude of the current $I_P$ generated by the photosensor 908 falls below the lower threshold current level $I_{LT}$, the switch M1 turns ON and the magnitude of the output voltage $V_O$ of the photocontrol apparatus 1000 becomes $V_{HIGH}$.

Because the photocontrol apparatus 1000 has two threshold current levels that depend on the state of the photocontrol circuit 902, when the value of the current $I_P$ generated by the photosensor 908 is close to either of the threshold current levels, relatively small fluctuations in the intensity of light that illuminates the photosensor 908 do not cause the switch M1 to turn ON and OFF. For example, when the output voltage level $V_O$ of the photocontrol apparatus 1000 is provided as input to a controller that controls a light source, relatively small changes in the intensity of light that illuminates the photosensor 908 that occur frequently do not cause the light source to turn ON and turn OFF for short periods of time.

The voltage levels at the non-inverting input node N and the inverting input node I of the comparator U1 depend the state of the switch M1 and the magnitude of the current $I_P$ generated by the photosensor 908. When the switch M1 is ON and the voltage level at the non-inverting node N of the comparator U1 falls below a first value of the voltage level at the inverting node I of the comparator U1 (i.e., an upper threshold voltage level $V_{UT}$), the comparator U1 causes the voltage level at the output node O to be such that the switch M1 turns OFF. When the switch M1 is OFF and the voltage level at the non-inverting node N of the comparator U1 rises above a second value of the voltage level at the inverting node I of the comparator U1 (i.e., a lower threshold voltage level $V_{ST}$), the comparator U1 cause the voltage level at the output node O to be such that the switch M1 turns ON.

Figure 15A:
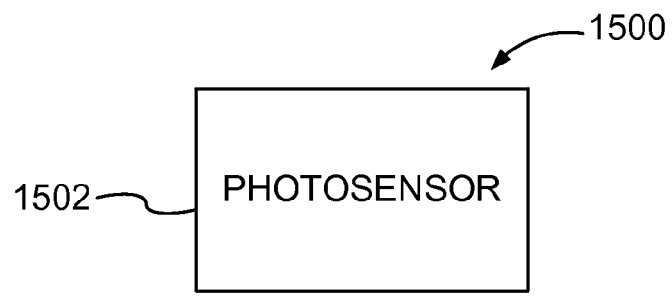
FIG. 15A is a block diagram of a photosensor, according to one illustrated embodiment.
Figure 15B:
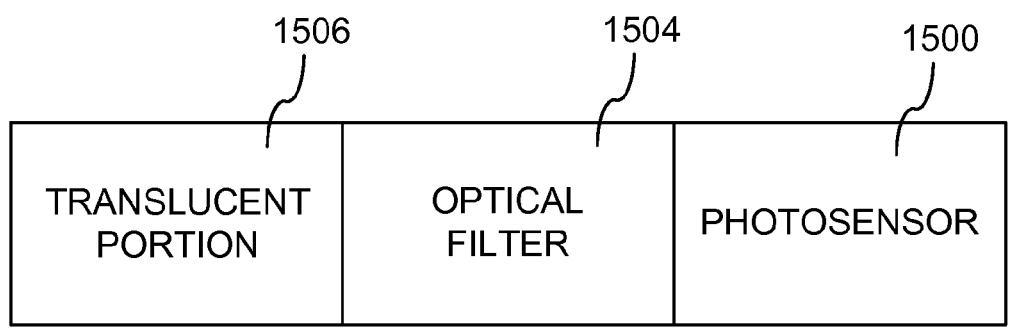
FIG. 15B is a block diagram of the photosensor shown in FIG. 15A arranged with an optical sensor, according to one illustrated embodiment.

FIG. 15A is a block diagram of a photosensor 1500, according to one illustrated embodiment. The photosensor 1500 includes a light receiving surface 1502 that, when illuminated with light, causes the photosensor 1500 to generate a current having a magnitude that is proportional to the intensity of the light. FIG. 15B is block diagram showing an optical filter 1504 disposed between a translucent portion 1506 (e.g., the translucent portion 504 of the housing 502 shown in FIG. 5) and the light receiving surface 1502 (not labeled in FIG. 15B) of the photosensor 1500. The optical filter 1504 may prevent one or more predetermined ranges of wavelengths of light passing through the translucent portion 1506 from reaching the light receiving surface 1502 of the photosensor 1500. That is, the optical filter 1504 may transmit only one or more predetermined ranges of wavelengths of light passing through the translucent portion 1506 to the light receiving surface 1502 of the photosensor 1500. The optical filter 1504 may be formed on the translucent portion 1506 or on the light receiving surface 1502 of the photosensor 1500. In one embodiment, the optical filter 1504 is integrally formed with the translucent portion 1506.

The optical filter 1504 may transmit to the light receiving surface 1502 of the photosensor 1500 only human visible wavelengths of light, for example, wavelengths of light between about 400 nanometers and 700 nanometers. In one embodiment, the optical filter 1504 transmits only wavelengths of light between about 380 nanometers and 750 nanometers to the light receiving surface 1502 of the photosensor 1500. The optical filter 1504 may transmit only wavelengths of light that corresponding to one or more colors. For example, the optical filter 1504 may transmit only wavelengths of light in a range of about 380 to 450 nanometers (i.e., violet light), in a range of about 450 to 495 nanometers (i.e., blue light), in a range of about 495 to 570 nanometers (i.e., green light), in a range of about 570 to 590 nanometers (i.e., yellow light), in a range of about 590 to 620 nanometers (i.e., orange light), and/or in a range of about 620 to 750 (i.e., red light). The values of wavelengths listed above are approximate and preferably do not deviate from the listed values by more than 10%. More preferably, the values of wavelengths listed above do not deviate from the listed values by more than 5%. The optical filter 1504 may take the form of an absorptive filter, a dichroic filter, a resonance filter, a mesh filter, and/or a polarizer.

Figure 16:
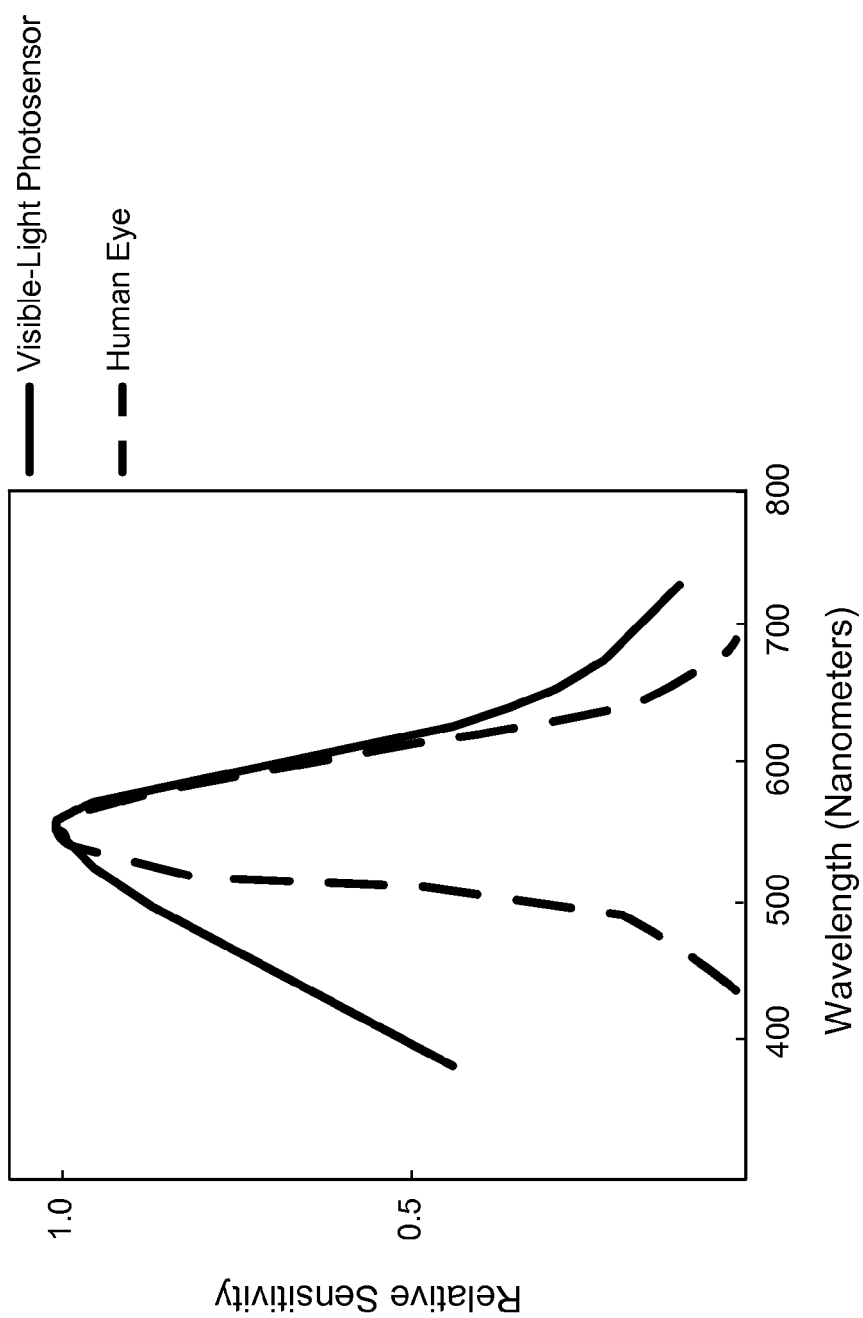
FIG. 16 is a plot showing the relative sensitivity of an amorphous visible-light photosensor, according to one non-limiting illustrated embodiment.

Alternatively or additionally, the photosensor 1500 may be an amorphous silicon photosensor having a relative sensitivity similar to that of the human eye. In one embodiment, the photosensor 1500 is a model AM-5308 photosensor from SANYO Amorton Co., Ltd having the relative sensitivity shown in FIG. 16. For example, the photosensor 1500 may output a current only when illuminated with human visible wavelengths of light in a range of about 400 nanometers to 700 nanometers, or only when illuminated with wavelengths of light in a range of about 380 nanometers to 730 nanometers. The values of wavelengths listed above are approximate and preferably do not deviate from the listed values by more than 10%. More preferably, the values of wavelengths listed above do not deviate from the listed values by more than 5%.

Figure 17:
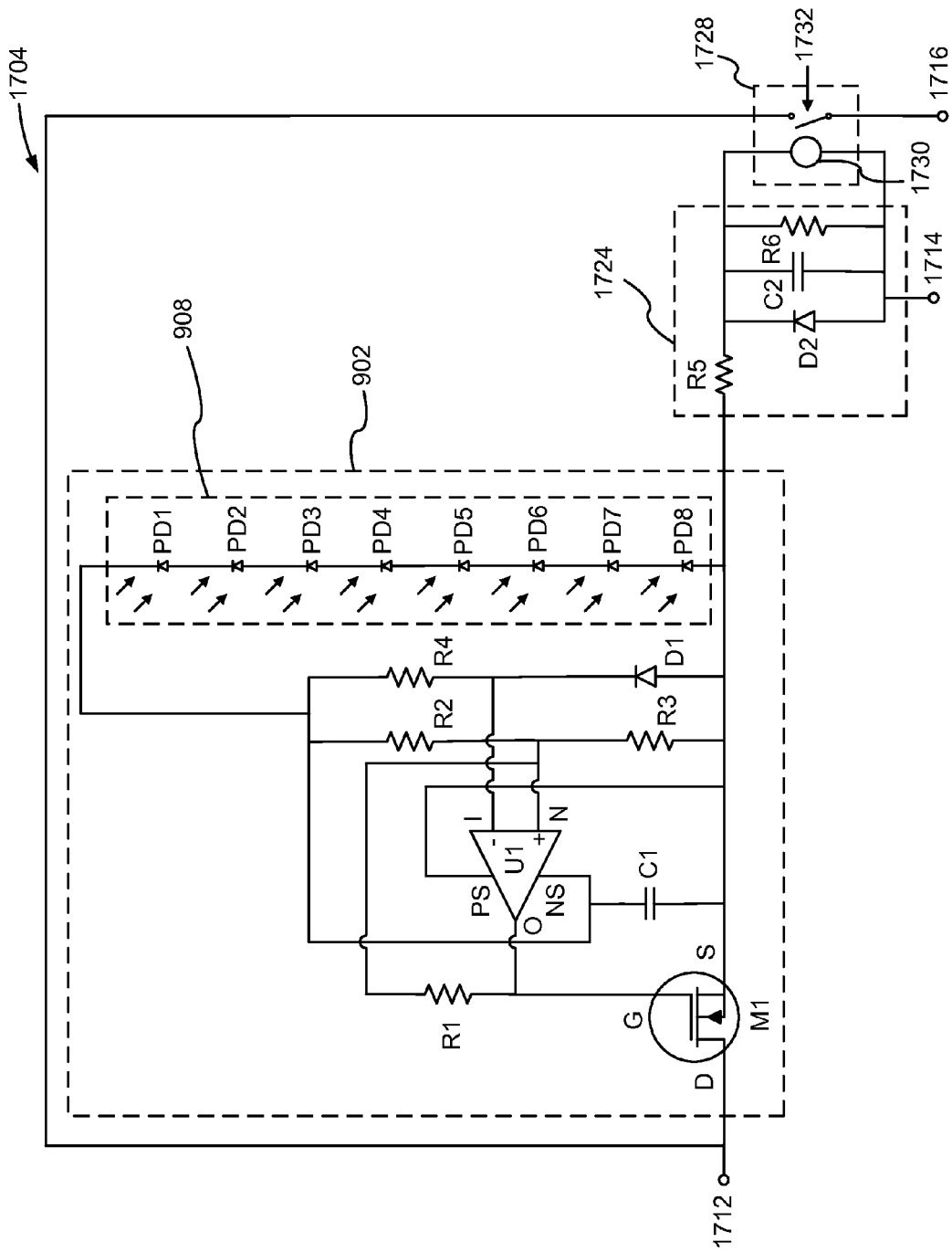
FIG. 17 is a detailed electrical schematic diagram of a photocontrol that can be used in the control system shown in FIG. 6, according to one illustrated embodiment.

FIG. 17 is a detailed electrical schematic diagram of a photocontrol apparatus 1704, according to one illustrated embodiment. The photocontrol apparatus 1704 includes a first node 1712, a second node 1714, and third node 1716. The photocontrol apparatus 1704 can be used in place of the photocontrol apparatus 604 shown in FIG. 6. That is, the first node 1712 of the photocontrol apparatus 1704 can be electrically coupled to the node 608 of the power source 602, the second node 1714 of the photocontrol apparatus 1704 can be electrically coupled to the node 610 of the power source 602 and the node 620 of the control device 606, and the third node 1716 of the photocontrol apparatus 1704 can be electrically coupled to the node 618 of the control device 606.

The photocontrol apparatus 1704 includes the photocontrol circuit 902 described above in connection with FIGS. 9 and 10, an output conditioner circuit 1724, and a relay device 1728, which includes a relay coil 1730 and a single pole, single throw switch 1732. The output conditioner circuit 1724 includes a diode D2, a capacitor C2, and resistive devices R5 and R6. The output conditioner circuit 1724 is coupled between the source node S of the switch M1 and the relay coil 1730 of the relay device 1728. The values of the components of the output conditioner circuit 1724 may be selected such that the control signals output by the output conditioner circuit 1724 have voltage and current levels that are compatible with the relay coil 1730.

The resistive device R6 of the output conditioner circuit 624 is electrically coupled to the relay coil 1730. During normal operation, the switch 1732 is closed (i.e., the switch 1732 is in an electrically continuous state). When the switch M1 outputs a control signal indicating that it is nighttime, the switch 1732 remains closed. When the switch M1 outputs a control signal indicating that it is daytime, the relay coil 1730 causes the switch 1732 to open (i.e., the switch 1732 transitions to an electrically discontinuous state). The switch 1732 remains open until the switch M1 outputs the control signal indicating that it is nighttime to the relay coil 1730, which causes the switch 1732 to close.

Figure 18A:
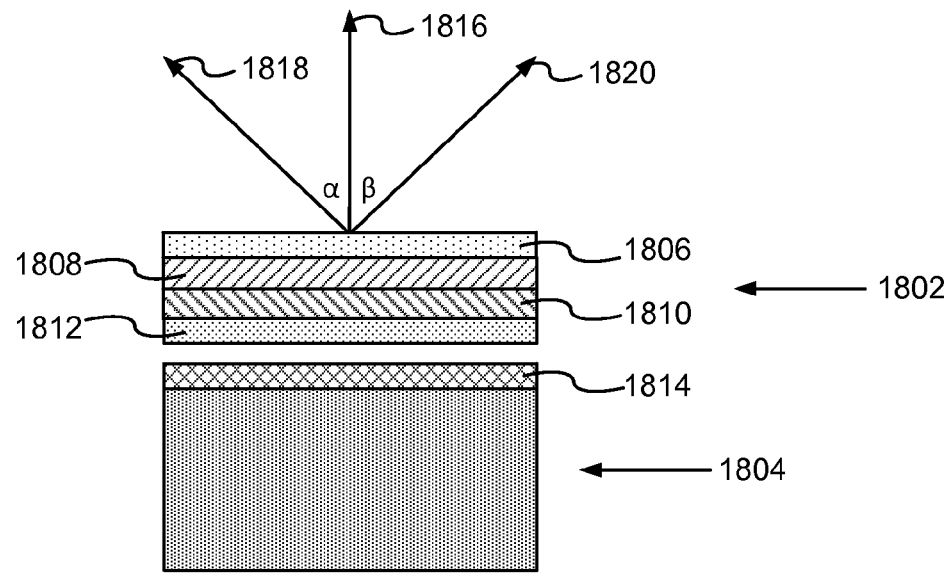
FIG. 18A is top plan view of an optical filter and a photosensor according to one illustrated embodiment.

FIG. 18A is top plan view of an optical filter 1802 and a photosensor 1804 according to one embodiment. The optical filter 1802 includes a first transparent portion 1806, a first partially opaque portion 1808, a second partially opaque portion 1810, and a second transparent portion 1812. The first partially opaque portion 1808 and the second partially opaque portion 1810 are disposed between the first transparent portion 1806 and the second transparent portion 1812. The first partially opaque portion 1808 and the second partially opaque portion 1810 include light absorbing louvers that prevent some of the light incident on the first transparent portion 1806 from reaching the second first transparent portion 1814. The photosensor 1804 includes a light receiving portion 1814 adjacent the second transparent portion 1812. Thus, the first partially opaque portion 1808 and the second partially opaque portion 1810 prevent some of the light incident on the first transparent portion 1806 from reaching the light receiving portion 1814 of the photosensor 1804.

The first transparent portion 1806 and the second transparent portion 1812 may be formed from a polycarbonate material. The first partially opaque portion 1808 and the second partially opaque portion 1810 may be formed from acrylic resin and carbon black materials. In one embodiment, the optical filter 1802 is a light control film that is disposed on the light receiving portion 1814 of the photosensor 1804. The optical filter 1802 may be secured to the light receiving portion 1814 of the photosensor 1804 with an adhesive. In one embodiment, the optical filter 1802 is formed from the Advanced Light Control Film ALCF-P ABR2 available from the 3M Company.

Reference arrows 1816, 1818, and 1820 are shown extending from the first transparent portion 1806 of the optical filter 1802. The reference arrow 1816 is perpendicular to the first transparent portion 1806 of the optical filter 1802 and may be perpendicular to the light receiving portion 1814 of the photosensor 1804. The reference arrows 1816 and 1818 form an angle α therebetween. The reference arrows 1816 and 1820 form an angle β therebetween. The angles α and β define a first field of view of the optical filter 1802 and thus the light receiving portion 1814 of the photosensor 1804.

The first partially opaque portion 1808 prevents light, which is incident on the first transparent portion 1806 of the optical filter 1802 that is not within the first field of view from reaching the light receiving portion 1814 of the photosensor 1804. For example, the first partially opaque portion 1808 may prevent light rays incident on the first transparent portion 1806, which originate from the right side of the reference arrow 1816 and form an angle greater than the angle β with the reference arrow 1816, from reaching the light receiving portion 1814 of the photosensor 1804. Additionally, the first partially opaque portion 1808 may prevent light rays incident on the first transparent portion 1806, which originate from the left side of the reference arrow 1816 and form an angle greater than the angle α with the reference arrow 1816, from illuminating the light receiving portion 1814 of the photosensor 1804. Accordingly, the first partially opaque portion 1808 may enable only light incident on the first transparent portion 1806 that is within the first field of view defined by angles α and β to illuminate the light receiving portion 1814 of the photosensor 1804.

In one embodiment, the first partially opaque portion 1808 enables only light that is within the angles α and β plus and minus a predefined tolerance to illuminate the light receiving portion 1814 of the photosensor 1804. For example, if each of the angles α and β is equal to 30 degrees and the tolerance is 4 degrees, the first partially opaque portion 1808 may enable only light that is within a field of view that extends from −34 degrees to 34 degrees with respect to the reference arrow 1816 to illuminate the light receiving portion 1814 of the photosensor 1804.

Figure 18B:
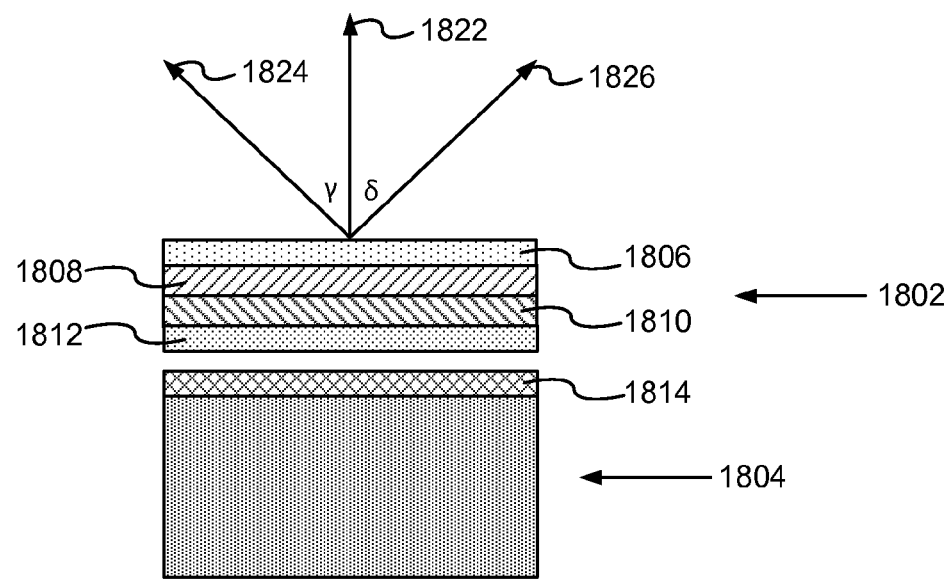
FIG. 18B is side plan view of the optical filter and the photosensor shown in FIG. 18A.

FIG. 18B is side plan view of the optical filter 1802 and the photosensor 1804. Reference arrows 1822, 1824, and 1826 are shown extending from the first transparent portion 1806 of the optical filter 1802. The reference arrow 1822 is perpendicular to the first transparent portion 1806 of the optical filter 1802 and may be perpendicular to the light receiving portion 1814 of the photosensor 1804. The reference arrows 1822 and 1824 form an angle γ therebetween. The reference arrows 1822 and 1826 form an angle δ therebetween. The angles γ and δ define a second field of view of the optical filter 1802 and thus the light receiving portion 1814 of the photosensor 1804.

The second partially opaque portion 1810 prevents light, which is incident on the first transparent portion 1806 of the optical filter 1802 that is not within the second field of view from reaching the light receiving portion 1814 of the photosensor 1804. For example, the second partially opaque portion 1810 prevents light rays incident on the first transparent portion 1806, which originate from the right of the reference arrow 1822 and form an angle greater than the angle δ with the reference arrow 1822, from illuminating the light receiving portion 1814 of the photosensor 1804. Additionally, the second partially opaque portion 1810 prevents light rays incident on the first transparent portion 1806, which originate from the left of the reference arrow 1822 and form an angle greater than the angle γ with the reference arrow 1822, from illuminating the light receiving portion 1814 of the photosensor 1804. That is, the second partially opaque portion 1810 enables only light incident on the first transparent portion 1806 that is within the second field of view defined by angles γ and δ to illuminate the light receiving portion 1818 of the photosensor 1804.

In one embodiment, the second partially opaque portion 1810 enables only light that is within the angles γ and δ plus and minus a predefined tolerance to illuminate the light receiving portion 1814 of the photosensor 1804. For example, if each of the angles γ and δ is equal to 30 degrees and the tolerance is 4 degrees, the second partially opaque portion 1810 may enable only light that is within a field of view that extends from −34 degrees to 34 degrees with respect to the reference arrow 1822 to illuminate the light receiving portion 1814 of the photosensor 1804.

Accordingly, the optical filter 1802 may transmit only light incident on the first transparent portion 1806 that is within the first field of view and also within the second field of view to the light receiving portion 1814 of the photosensor 1804. In one embodiment, the optical filter 1802 and the photosensor 1804 are included in a housing that is transparent. For example, the optical filter 1802 and the photosensor 1804 may be included in the housing 502 shown in FIG. 5, wherein the entire housing 502 is transparent and thus the window 504 may be omitted.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 61/052,924, filed May 13, 2008; U.S. Patent Publication No. US 2009/0284155, published Nov. 19, 2009; U.S. Provisional Patent Application No. 61/051,619, filed May 8, 2008; U.S. Pat. No. 8,118,456, issued Feb. 12, 2012; U.S. Provisional Patent Application No. 61/088,651, filed Aug. 13, 2008; U.S. Patent Publication No. US 2010/0090577, published Apr. 15, 2010; U.S. Provisional Patent Application No. 61/115,438, filed Nov. 17, 2008; U.S. Provisional Patent Application No. 61/154,619, filed Feb. 23, 2009; U.S. Patent Publication No. US2010/0123403, published May 20, 2010; U.S. Provisional Patent Application No. 61/174,913, filed May 1, 2009; U.S. Patent Publication No. US2010/0277082, published Nov. 4, 2010; U.S. Provisional Patent Application No. 61/180,017, filed May 20, 2009; U.S. Patent Publication No. US2010/0295946, published Nov. 25, 2010; U.S. Provisional Patent Application No. 61/229,435, filed Jul. 29, 2009; U.S. Patent Publication No. US2011/0026264, published Feb. 3, 2011; U.S. Provisional Patent Application No. 61/295,519 filed Jan. 15, 2010; U.S. Provisional Patent Application No. 61/406,490 filed Oct. 25, 2010; U.S. Patent Publication No. US2011/0175518, published Jul. 21, 2011; U.S. Provisional Patent Application Ser. No. 61/333,983, filed May 12, 2010; U.S. Patent Publication No. US2010/0295454, published Nov. 25, 2010; U.S. Provisional Patent Application Ser. No. 61/346,263, filed May 19, 2010, U.S. Patent Publication No. US2010/0295455, published Nov. 25, 2010; U.S. Provisional Patent Application Ser. No. 61/357,421, filed Jun. 22, 2010; U.S. Patent Publication No. US2011/0310605, published Dec. 22, 2011; U.S. Patent Publication No. 2012/0262069, published Oct. 18, 2012; U.S. Non-Provisional patent application Ser. No. 13/212,074, filed Aug. 17, 2011; U.S. Provisional Patent Application Ser. No. 61/527,029, filed Aug. 24, 2011; U.S. Non-Provisional patent application Ser. No. 13/592,590 filed Aug. 23, 2012; U.S. Provisional Patent Application Ser. No. 61/534,722, filed Sep. 14, 2011; U.S. Non-Provisional patent application Ser. No. 13/619,085, filed Sep. 14, 2012; U.S. Provisional Patent Application Ser. No. 61/567,308, filed Dec. 6, 2011; U.S. Provisional Patent Application Ser. No. 61/561,616, filed Nov. 18, 2011; U.S. Provisional Patent Application Ser. No. 61/641,781, filed May 2, 2012; U.S. Non-Provisional patent application Ser. No. 13/411,321 filed Mar. 2, 2012; U.S. Provisional Patent Application Ser. No. 61/640,963, filed May 1, 2012; U.S. Non-Provisional patent application Ser. No. 13/558,191 filed Jul. 25, 2012; U.S. Provisional Patent Application Ser. No. 61/692,619, filed Aug. 23, 2012; U.S. Provisional Patent Application Ser. No. 61/694,159, filed Aug. 28, 2012; U.S. Non-Provisional patent application Ser. No. 13/604,327 filed Sep. 5, 2012; U.S. Provisional Patent Application Ser. No. 61/723,675, filed Nov. 7, 2012; U.S. Non-Provisional patent application Ser. No. 13/679,687, filed Nov. 16, 2012; U.S. Provisional Patent Application Ser. No. 61/728,150, filed Nov. 19, 2012; U.S. Provisional Patent Application Ser. No. 61/764,395, filed Feb. 13, 2013; and U.S. Provisional Patent Application Ser. No. 61/849,841, filed Jul. 24, 2013 are incorporated herein by reference, in their entirety. Aspects of the embodiments can be modified, if necessary, to employ systems, circuits and concepts of the various patents, applications and publications to provide yet further embodiments.

For example, a photocontrol apparatus according to the present disclosure can provide control signals to a control device that receives additional control signals from other environmental sensors, for example, a motion sensor, a proximity sensor, and an occupancy sensor. Such a control device can be programmed to control a luminaire based on the control signals received from two or more of the environmental sensors and a current time of day. For example, the control device can cause the luminaire to produce a signal indicating a security breach and to illuminate an array of LEDs if, during a time period specified for night operations, the photocontrol indicates that a detected light level is above a desired level and a motion sensor indicates that motion has been detected.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A photocontrol apparatus to provide a plurality of control signals to a high-impedance controller input used to control the delivery of power to a load device, the apparatus comprising:
a switch including a first node, a second node, and a third node, the first node electrically, communicably coupled to a source of electrical power and the third node electrically, communicably coupled to the high-impedance controller input; and
a photosensor electrically, communicably coupled between the second node and the third node, the photosensor operable to at least partially cause a voltage level of the second node with respect to a voltage level of the third node to change when the photosensor outputs current in response to being at least partially illuminated with light, wherein
when the voltage level of the second node with respect to the voltage level of the third node is greater than a threshold voltage level, the third node outputs a first control signal, and
when the voltage level of the second node with respect to the voltage level of the third node is less than the threshold voltage level, the third node outputs a second control signal different from the first control signal.

2. The photocontrol apparatus of claim 1 wherein the photosensor is electrically coupled to at least partially cause the voltage level of the second node with respect to the voltage level of the third node to decrease when the photosensor outputs current in response to being at least partially illuminated with light.

3. The photocontrol apparatus of claim 1, further comprising:
a resistive device electrically, communicably coupled between the second node and the third node, the resistive device operable to at least partially cause the voltage level of the second node with respect to the voltage level of the third node to change when the photosensor outputs current in response to being at least partially illuminated with light.

4. The photocontrol apparatus of claim 3 wherein a resistance of the resistive device is adjustable.

5. The photocontrol apparatus of claim 1, further comprising:
a housing at least partially enclosing the switch and the photosensor, the housing including a translucent portion and a shutter coupled to the housing, the shutter being moveable to selectively block and unblock at least part of the ambient light passing through the translucent portion.

6. The photocontrol apparatus of claim 1 wherein
the switch is a Metal Oxide Semiconductor Field Effect Transistor (MOSFET),
the first node is a drain node of the MOSFET,
the second node is a gate node of the MOSFET, and
the third node is a source node of the MOSFET.

7. The photocontrol apparatus of claim 1 wherein a cathode of the photosensor is electrically, communicably coupled to the second node and an anode of the photosensor is electrically, communicably coupled to the third node.

8. The photocontrol apparatus of claim 1 wherein a voltage level of the first control signal is greater than a voltage level of the second control signal.

9. The photocontrol apparatus of claim 1, further comprising:
an output conditioner circuit electrically, communicably coupled between the third node and the high-impedance controller input, the output conditioner circuit operable to change a voltage level of the first control signal and a voltage level of the second control signal.

10. The photocontrol apparatus of claim 1 wherein the photosensor outputs current only when illuminated by wavelengths of light in a range of about 380 nanometers to about 730 nanometers.

11. The photocontrol apparatus of claim 1, further comprising:
an optical filter disposed on a light receiving surface of the photosensor, the optical filter transmitting only human visible wavelengths of light to the photosensor.

12. The photocontrol apparatus of claim 1, further comprising:
a housing; and
an optical filter disposed within the housing adjacent a light receiving portion of the photosensor, the optical filter transmitting only light incident on the optical filter that is within a predetermined field of view to the light receiving portion of the photosensor.

13. A photocontrol apparatus to permit, when in an electrically continuous state, a source of electrical power to provide a power signal to an input of a control device used to control the delivery of power to a load device, the apparatus comprising:
a switch including a first node, a second node, and third node, the first node electrically, communicably coupled to the source of electrical power and the third node electrically, communicably coupled to the input of the control device; and
a photosensor electrically, communicably coupled between the second node and the third node, the photosensor operable to at least partially cause a voltage level of the second node with respect to the voltage level of the third node to change when the photosensor outputs current in response to being at least partially illuminated with light, wherein
when the voltage level of the second node with respect to the voltage level of the third node is greater than a threshold voltage level, the photocontrol apparatus outputs the power signal, and
when the voltage level of the second node with respect to the voltage level of the third node is less than the threshold voltage level, the photocontrol apparatus does not output the power signal.

14. The photocontrol apparatus of claim 13 wherein the photosensor is operable to at least partially cause the voltage level of the second node with respect to the voltage level of the third node to decrease when the photosensor outputs current in response to being at least partially illuminated with light.

15. The photocontrol apparatus of claim 13, further comprising:
a resistive device electrically, communicably coupled between the second node and the third node, the resistive device operable to at least partially cause the voltage level of the second node with respect to the voltage level of the third node to change when the photosensor outputs current in response to being at least partially illuminated with light.

16. The photocontrol apparatus of claim 15 wherein a resistance of the resistive device is adjustable.

17. The photocontrol apparatus of claim 13, further comprising:

a housing at least partially enclosing the switch and the photosensor, the housing including a translucent portion and a shutter coupled to the housing, the shutter being moveable to selectively block and unblock at least part of the translucent portion from ambient light.

18. The photocontrol apparatus of claim 13 wherein
the switch is a Metal Oxide Semiconductor Field Effect Transistor (MOSFET),
the first node is a drain node of the MOSFET,
the second node is a gate node of the MOSFET, and
the third node is a source node of the MOSFET.

19. The photocontrol apparatus of claim 13 wherein a cathode of the photosensor is electrically, communicably coupled to the second node and an anode of the photosensor is electrically, communicably coupled to the third node.

20. The photocontrol apparatus of claim 13 wherein the third node outputs the power signal when the voltage level of the second node with respect to the voltage level of the third node is greater than the threshold voltage level.

21. The photocontrol apparatus of claim 13, further comprising:
a relay device electrically, communicably coupled between the source of electrical power and the input of the control device, the relay device operable to switch between an electrically continuous state and an electrically discontinuous state based on a signal output from the third node.

22. The photocontrol apparatus of claim 21 wherein the relay device outputs the power signal when the voltage level of the second node with respect to the voltage level of the third node is greater than the threshold voltage level.

23. The photocontrol apparatus of claim 13 wherein the photosensor outputs current only when the photocontrol apparatus is at least partially illuminated with human visible wavelengths of light.

24. The photocontrol apparatus of claim 13, further comprising:
a housing; and
an optical filter disposed within the housing adjacent a light receiving portion of the photosensor, the optical filter transmitting only light incident on the optical filter that is within a predetermined field of view to the light receiving portion of the photosensor.

25. A photocontrol apparatus comprising:
a switch including a first node, a second node, and a third node, wherein the first node of the switch is electrically, communicably coupled to a source of electrical power and the third node of the switch is electrically, communicably coupled to an input of a control device;
a comparator including a first power supply node, a second power supply node, a first input node, a second input node, and a power output node, wherein the power output node is electrically, communicably coupled to the second node of the switch and at least one of the first and the second power supply nodes is electrically, communicably coupled to the third node of the switch; and
a photosensor electrically, communicably coupled between the second node of the switch and the third node of the switch, the photosensor operable to at least partially cause a voltage level of the first input node with respect to the second input node to change when the photosensor outputs current in response to being at least partially illuminated with light.

26. The photocontrol apparatus of claim 25 wherein when the switch is in a first state and the photosensor causes the voltage level of the first input node to fall below a first threshold voltage level the comparator causes the switch to change to a second state, and when the switch is in the second state and the photosensor causes the voltage level of the first input node to rise above a second threshold voltage level the comparator causes the switch to change to the first state.

27. The photocontrol apparatus of claim 26 wherein the switch is in the first state when the switch is turned ON, and the switch is in the second state when the switch is turned OFF.

28. The photocontrol apparatus of claim 26 wherein the third node of the switch outputs a first control signal when the switch is in the first state, and the third node of the switch outputs a second control signal when the switch is in the second state.

29. The photocontrol apparatus of claim 26 wherein the voltage level of the first control signal is greater than the voltage level of the second control signal.

30. The photocontrol apparatus of claim 26 wherein the third node of the switch outputs a power signal to the input of the control device when the switch is in the first state, and the third node of the switch does not output the power signal to the input of the control device when the switch is in the second state.

31. The photocontrol apparatus of claim 25 further comprising:
a capacitor electrically, communicably coupled between the third node of the switch and the first power supply node.

32. The photocontrol apparatus of claim 25 further comprising:
a reference voltage source electrically, communicably coupled between the third node of the switch and the second input node.

33. The photocontrol apparatus of claim 32 wherein the reference voltage source is a diode.

34. The photocontrol apparatus of claim 25 wherein the comparator is an operational amplifier including a negative voltage supply node, a positive voltage supply node, a non-inverting input node, an inverting input node, and a voltage output node, and wherein the negative voltage supply node is the first power supply node, the positive voltage supply node is the second power supply node, the non-inverting input node is the first input node, the inverting input node is the second input node, and the voltage output node is the power output node.

35. The photocontrol apparatus of claim 25, further comprising:
a first resistive device electrically, communicably coupled between the power output node and the first input node;
a second resistive device electrically, communicably coupled between the photosensor and the first input node; and
a third resistive device electrically, communicably coupled between the first input node and the third node of the switch.

36. The photocontrol apparatus of claim 35 wherein the second resistive device and the third resistive device are included in a potentiometer.

37. The photocontrol apparatus of claim 25, further comprising:
a housing at least partially enclosing the switch and the photosensor, the housing including a translucent portion and a shutter coupled to the housing, the shutter being moveable to selectively block and unblock at least part of the translucent portion from ambient light.

38. The photocontrol apparatus of claim 25 wherein
the switch is a Metal Oxide Semiconductor Field Effect Transistor (MOSFET),
the first node of the switch is a drain node of the MOSFET,
the second node of the switch is a gate node of the MOSFET, and
the third node of the switch is a source node of the MOSFET.

39. The photocontrol apparatus of claim 25 wherein the photosensor outputs current only when the photocontrol apparatus is at least partially illuminated with human visible wavelengths of light.

40. The photocontrol apparatus of claim 25, further comprising:
a relay device electrically, communicably coupled between a source of electrical power and the input of the control device, the relay device operable to switch between an electrically continuous state and an electrically discontinuous state based on a signal output from the third node of the switch.

41. The photocontrol apparatus of claim 40 wherein the relay device outputs a power signal to the input of the control device when the switch is in the first state, and the relay device does not output the power signal to the input of the control device when the switch is in the second state.

42. The photocontrol apparatus of claim 25, further comprising:
a housing; and
an optical filter disposed within the housing adjacent a light receiving portion of the photosensor, the optical filter transmitting only light incident on the optical filter that is within a predetermined field of view to the light receiving portion of the photosensor.

* * * * *